(12) United States Patent
Hawkins et al.

(10) Patent No.: US 8,132,236 B2
(45) Date of Patent: Mar. 6, 2012

(54) SYSTEM AND METHOD FOR PROVIDING SECURED ACCESS TO MOBILE DEVICES

(75) Inventors: Jeffrey C. Hawkins, Sunnyvale, CA (US); Bernard Paul Cousineau, Burlingame, CA (US); David C. Blight, Oceanside, CA (US); Yoon Kean Wong, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1172 days.

(21) Appl. No.: 11/725,599

(22) Filed: Mar. 19, 2007

(65) Prior Publication Data

US 2007/0277230 A1 Nov. 29, 2007

Related U.S. Application Data

(63) Continuation-in-part of application No. 10/012,661, filed on Nov. 12, 2001, now Pat. No. 7,561,691, and a continuation-in-part of application No. 11/610,949, filed on Dec. 14, 2006.

(51) Int. Cl.
*G06F 7/04* (2006.01)
(52) U.S. Cl. .......................................................... 726/4
(58) Field of Classification Search .......................... None
See application file for complete search history.

(56) References Cited

U.S. PATENT DOCUMENTS

| | | | |
|---|---|---|---|
| 5,661,803 A | 8/1997 | Cordery et al. | |
| 5,721,781 A | 2/1998 | Deo et al. | |
| 5,774,550 A | 6/1998 | Brinkmeyer et al. | |
| 6,213,391 B1 | 4/2001 | Lewis | |
| 6,633,761 B1 * | 10/2003 | Singhal et al. | 455/436 |
| 6,772,331 B1 * | 8/2004 | Hind et al. | 713/151 |
| 6,774,796 B2 | 8/2004 | Smith | |
| 6,870,459 B1 | 3/2005 | Fest et al. | |
| 6,871,063 B1 * | 3/2005 | Schiffer | 455/410 |
| 7,561,691 B2 | 7/2009 | Blight et al. | |
| 2002/0023010 A1 | 2/2002 | Rittmaster et al. | |

OTHER PUBLICATIONS

Howstuffworks, How do digital signatures work?, printed from the Internet web site: http://www.howstuffworks.com/question571.htm on Oct. 2, 2001, pp. 1-6.
PC Magazine: Digital Signatures: How They Work (Apr. 9, 1996), printed from the Internet web site: http://www.zdnet.com/pcmag/issues/1507/pcmg0090.htm on Oct. 2, 2001, pp. 1-6.
Howstuffworks, "How Encryption Works", printed from the Internet web site: http://www.howstuffworks.com/encryption.htm?printable=1 on Oct. 2, 2001, 1-6.
Howstuffworks, "How Remoate Entry Works", printed from the Internet web site: http://www.howstuffworks.com/remote-entry.htm?printable=1 on Oct. 2, 2001, pp. 1-6.
Howstuffworks, "How Bluetooth Short Range Radio Systems Work", printed from the Internet web site: http://www.howstuffworks.com/bluetooth.htm?printable=1 on Oct. 1, 2001, pp. 1-6.

(Continued)

*Primary Examiner* — Brandon Hoffman

(57) ABSTRACT

A system and method for providing secured access of a mobile device is disclosed herein. Access to data included in the mobile device is permitted when the presence of an authentication device having the proper authentication information is received by the mobile device.

41 Claims, 11 Drawing Sheets

OTHER PUBLICATIONS

Palowireless Bluetooth Resource Center, "What is Bluetooth?", printed from the Internet web site: http://www.palowireless.com/infotooth/whatis.asp on Sep. 28, 2001, pp. 1-2.

Palowireless Bluetooth Resource Center, BlueRF: Interface Protocol between the Baseband IC and the RF (Radio) Unit, printed from the Internet web site: http://www.palowireless.com/infotooth/knowbase/general/30.asp on Sep. 28, 2001, pp. 1-2.

Palowireless Bluetooth Resource Center, "Bluetooth Tutorial—Start", printed from the Internete web site: http://www.palowireless.com/infotooth/tutorial.asp on Sep. 28, 2001, pp. 1-3.

Palowireless Bluetooth Resource Center, "Bluetooth Tutorials—Profiles", printed from the Internet web site: http://www.palowireless.com/infotooth/tutorial/profiles.asp on Sep. 28, 2001, pp. 1-4.

Webster's II New Riverside University Dictionary, 1984-1998, Houghton Mifflin Company, definition of 'Mobile.'

U.S. Appl. No. 11/610,949, filed Dec. 14, 2006, Applicant: Hawkins et al., Titled "System and Method for Implementing Security Features and Policies Between Paired Computing Devices".

* cited by examiner

SYSTEM AND METHOD FOR PROVIDING SECURED ACCESS TO MOBILE DEVICES

CROSS-REFERENCE TO RELATED APPLICATIONS

This application is a continuation-in-part of U.S. application Ser. No. 10/012,661 filed Nov. 12, 2001 and U.S. application Ser. No. 11/610,949 filed Dec. 14, 2006, both of which are herein incorporated by reference in their entireties.

TECHNICAL FIELD

The disclosed embodiments relate generally to the field of policy and security implementation on computing devices. More specifically, embodiments described herein provide a system and method for implementing security features and policies between paired devices.

The embodiments relate generally to the field of security devices for mobile, handheld computing, and/or communication devices.

BACKGROUND

With widespread use of computing devices such as cell phones and laptops, what has become valuable is the security of the data carried on such devices. For example, cell phones may carry phone logs, emails and pictures of a user's family, while laptops may carry much more sensitive information pertaining to an enterprise or business.

To safeguard data, so called "kill pills" have been developed where devices such as cell phones can be destroyed or erased with remote instructions. Under one kill pill, a cellular messaging and telephony device may receive an instruction carried over a cellular network to destroy itself or its data. The receiving device then performs the instruction to erase its data. While it is possible for the device to be usable after the kill operation, the data on the device may be safeguarded after the instruction is issued.

A possible danger and/or inconvenience of utilizing devices such as handheld and/or mobile electronic devices is that if the handheld and/or mobile device is lost or stolen, the finder or thief may access all of the financial and/or personal information on the device. Currently a variety of methods are used to protect data on such devices, most commonly the utilization of the entering of a password and/or the entering of a combination of user name and password. However, it has been shown that the use of a password and/or the inconvenience that a user must input a password each time the information is to be accessed has been shown to be undesirable. In the first instance, it has been shown that passwords may be circumvented by a variety of techniques known and practiced by computer savvy persons, hackers, and the like. Further, in the event that a person wishes to access specific information using the portable electronic device, it is often an inconvenience that the person accessing the information is required to input a password each time such information is requested and/or desired.

Accordingly, there is a need to provide an ability to protect data on a mobile electronic device without the use of a password or other conventional means. There is also a need for a mobile electronic device that includes a separate access device which allows access to secured information on the mobile electronic device. Further, there is a need for a wireless access device that is separate from the mobile device and allows access to the personal and/or financial information on the device when the device is within a close proximity of the mobile device. Further still, there is a need for a method of providing access to personal and/or financial information on the mobile device by the utilization of a wireless access device. Yet further still, there is a need for a wireless access device that prevents access to the use of the mobile device unless the access device is within a close proximity of the mobile device.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Figure 1A:
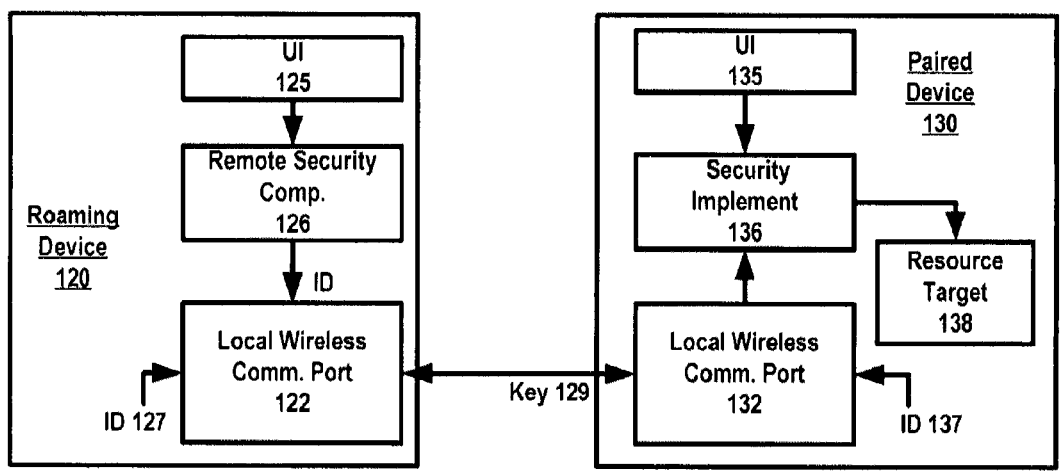
FIG. 1A illustrates a system formed by paired computing devices, in which at least one of the devices uses the other device to configure one or more security or policy features, under an embodiment of the invention.

Embodiments described herein enable the establishment and use of pairings among computing devices for purpose of managing or controlling security features or policies on one or both devices.

According to an embodiment, a remote directive to implement a security feature or policy may be communicated to a computing device that does not have the inherent ability to receive the communication, at least at the time the directive is to be communicated. Such may be the case where the directive is to be communicated to, for example, a laptop or other portable computing device that does not have wireless connectivity in effect. For example, laptops do not always have cellular data communication capabilities, and when such capabilities are present, they are typically operated in a manually triggered, intermittent mode to preserve expenses and/or battery life.

One or more embodiments assume that many mobile users of computing devices carry cellular data devices that do have continuous data connectivity via the cellular networks. According to one or more embodiments, directives to implement policies and actions may be communicated to non-connected devices (e.g. laptop with intermittent connectivity) using the cellular data device that is connected and receiving communications via the cellular networks.

One or more embodiments provide for using a roaming device (e.g. cellular data device) to secure data and/or resources on an associated computing device. In an embodiment, the roaming device may communicate with a remote policy node or station to receive one or more policy directives. The roaming device may use a wireless wide area network (WAN) to communicate with the policy node, such as provided by cellular networks. The roaming device may cause the paired computing device to implement or configure a policy by communicating an instruction to the paired computing device. This instruction may be based on the policy directives that the roaming device receives from the policy node. The communication exchanged between the roaming device and the paired computing device may be over a local wireless communication port, such as provided by short-range wireless communication ports.

According to another embodiment, a computing device may, as default, implement one or more security features. The computing device may be configured to receive a security code from a roaming device over a local, wireless communication port. The computing device may use the security code to alter implementation of at least one of the security features that it implements, by suspending or reducing one or more user-actions that would otherwise be required by the security features in order to access protected data and resources.

As used herein, the term "policy" means a set of rules that are to govern one or more aspects of the operation of a computing device in a particular environment or under a given set of conditions.

Embodiments described herein also include a system and method in which a connected roaming computing device is used to implement policy and security features directed from a remote policy manager onto an associated computing device.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using modules. A module may include a program, a subroutine, a portion of a program, or a software component or a hardware component capable of performing one or more stated tasks or functions. As used herein, a module can exist on a hardware component independently of other modules, or a module can be a shared element or process of other modules, programs or machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Security Implementation Using Paired Devices

FIG. 1A illustrates a system formed by paired computing devices, in which at least one of the devices uses the other device to configure one or more security or policy features, under an embodiment of the invention. In an embodiment such as shown by FIG. 1A, the paired devices comprise a roaming device 120 and a paired, associated computing device 130. Numerous types of computer devices may comprise the individual devices that form a pair such as described with an embodiment of FIG. 1A. For example, the roaming device 120 may correspond to a wireless mobile computing device, such as a cellular telephony device (e.g. smart phone), or to a light/small form-factor laptop. The associated computing device 130, for example, may correspond to a laptop, or to a computing device that may require relatively more security than the roaming device 120. In an implementation provided by FIG. 1A, the associated computing device 130 uses the presence of the roaming device 120 to activate or de-activate one or more security features.

As paired devices, the roaming device 120 and/or the associated computing device 130 may be configured to recognize or detect the other device's presence or proximity. Still further, in one or more embodiments, the roaming device 120 and the associated computing device 130 are trusted and paired, so that one or both devices may be configured to recognize and trust the other device to share or receive data from the other device of the pairing. As described with other embodiments, numerous alternative or additional relationships may exist between the associated computing device 130 and the roaming device 120. For example, under one implementation, the paired devices may perform persistent or continuous synchronization processes, and/or state transfers to indicate state of use on one device when the other device is activated or made user-operable. The paired devices may also exchange profile information pertaining to a user of both devices.

In one embodiment, components of the roaming device 120 include a local communication process 124, and a remote security component 126. Components of the associated computing device 130 may include a corresponding local communication port 132, a security implement component 136, and a resource target 138. Each local wireless communication port 122, 132, may correspond to, for example, a Bluetooth or a wireless USB port. Each device 120, 130 may use its respective wireless communication port 122, 132 to detect when the other device is present. The resource target 138 may correspond to a security feature, program, or protected data residing on the associated computing device 130. In an embodiment, the presence of the roaming device 120 is used to provide access and/or security to the resource target 138.

Numerous detection schemes and protocols may be implemented in order have the paired devices detect and communicate with one another. In one embodiment, the roaming device 120 includes an identifier 127 that can form a basis for enabling the associated computing device 130 to detect its presence. The associated device 137 may also include an identifier 137. Each of the identifiers 127, 137 may correspond to, for example, a device name or code that the device uses as part of its Bluetooth communications. Alternatively, the identifiers may communicate other device names, codes or security keys for the other device. In one implementation, detection amongst the paired devices may be accomplished by one or both devices repeatedly or continuously seeking out and/or identifying itself for the other device when their particular communication port 122, 132 of the device becomes active. In another implementation, one or both devices 120, 130 may become active at a particular instance, or in response to a given condition or event. For example, the associated computing device 130 may broadcast its identifier 137 using the local communication port 132, and/or seek out the identifier 127 of the roaming device, in response to (i) being activated, or (ii) having the local communication port 132 made active.

When the roaming device 120 and the associated computing device 130 are in proximity to one another, the paired devices may perform a key exchange process in which a security key 129 is transferred from the roaming device 120 to the associated computing device 130. The security key 129 enables or disables a security feature provided by the security implement component 136 of the associated computing device 130. The key exchange process may be accomplished through transmission or exchange of a communication or series of communications between the roaming device 120 and the associated computing device 130. In one embodiment, the security key 129 corresponds to the device identifier 127, so that the key exchange and the device detection processes are the same or at least concurrently performed. In another embodiment, the security key 129 is stored on the device 120, but is a different data element than the identifier 127. In such an embodiment, the key exchange and device detection processes may be separate of one another. As additional examples, the security key 129 may correspond to a password (text data), password and login combination, encryption key, or other identifier associated with the particular roaming device 120 or its user. In addition, the security key 129 may be a value derived from the device identifier 127.

According to one embodiment, the roaming device 120 and the associated computing device 130 are devices that are in a trusted and paired relationship. Such relationships may be established using or as part of local wireless communication protocols, such as Bluetooth. In one embodiment, a user operates associated computing device 130 to establish the relationship with a particular roaming device 120. When both devices are identified to one another by name, one or the other device may generate a passkey number or identifier for display to the user. The user may enter the passkey identifier manually into the other device. For example, the associated computing device 130 may generate a passkey that the user enters into his cell phone (which is the roaming device 120). The passkey can be used to generate subsequent security codes when the two devices exchange communications and/or when one device uses presence detection of the other device. After entry of the passkey, both devices can identify one another by name and by a security code that is derived from the passkey. Moreover, established local wireless communication protocols such as Bluetooth preclude one device from identifying itself as another device. In this way, the trusted relationship between the two devices remains secure.

The local wireless communication ports 122, 132 may be used to accomplish the key exchange process. During the key exchange process (presumably after or concurrent with the device detection process), the local communication port 132 receives security key 129. The security implement component 136 is configured to recognize the security key 129 from the roaming device 120. In response to receiving the security key 129, the security implement component 136 may enable, disable or configure one or more security features pertaining to access or use of the targeted resource 138. In one embodiment, the security implement component 136 generates a password for use with a password protection feature that limits access to the targeted resource 138. For example, the targeted resource 138 may correspond to a user-interface that enables access to an application, account (maintained on the associated device) or the entire device's data. The security implement component 136 may identify the security code 136, and apply it to the user-interface programmatically, so that the user does not have to enter the password manually. Thus, in one implementation, the security implement component 136 recognizes the transmission as the security code 129, converts the code from a transmission format into a string of characters, and applies the characters as a password to the user-interface feature that protects the targeted resource 138 with password entry. In another implementation, the security code 129 may trigger a mode or setting that designates superior or alternative access rights, such as administrative rights, and the user-interface feature for requiring password access to the target resource 138 is suspended. Still further, a "backdoor" hook may be embedded in the target resource 138, and the security code 129 triggers the backdoor hook to suspend or bypass the security feature.

The devices forming the pairing of an embodiment of FIG. 1A may correspond to any type of computing device, including mobile devices (e.g. media players, cellular telephony devices, personal digital assistants), laptop computers (which are portable), or desktop computers. Either of the devices shown in an embodiment of FIG. 1A may also alternatively correspond to a specialty computing device, such as a GPS computer and/or a car kit computer (for telephony devices or media players etc.). In one implementation, the roaming device 120 is a mobile computing device capable of wireless WAN data communications, such as cellular telephony and data exchange. Such devices are sometimes referred to as "smart phones" or "mobile managers". The associated computing device 130 may correspond to a portable computing device, such as a laptop. In such an implementation, both devices may be portable, but the mobile computing device is capable of being carried in close proximity to the user, carries less information, and thus is presumably either more secure or less prone to significant data loss. Laptop computers can be less secure, as they are not always well-attended. At the same time, laptop computers have full computing resources, with the potential of significant data loss if the device is stolen or misappropriated. In this kind of pairing, the security implement component 136 of the associated computing device 130 may correspond to a software program or user-interface that locks the entire device from use. The mobile computing device may communicate the identifier 127 (e.g. as part of its Bluetooth protocol) when in sufficient proximity to enable Bluetooth connectivity with the laptop. Receipt of the identifier 127 may thus serve the function of the security key 129, and indicate the laptop is secure. Alternatively, the exchange of identifiers 127, 137 may trigger the key exchange process. The security implement component 136 may receive a code (e.g. security code or password) or even translate the identifier 127 into a password that unlocks the device. Such functionality may also be performed in conjunction with other suspension/bypass procedures described above.

As an alternative to an embodiment described, the remote security component 124 of the roaming device 120 (e.g. cell phone) may carry the password for use on the associated computing device 130 (e.g. laptop). When in proximity, the roaming device 120 may simply communicate the password or other key that is then used by the associated computing device 130. In the case of a password, for example, one implementation provides that the communication from the roaming device 120 may carry the characters that comprise the password, and are translated by the security implement component 136 as if the password was directly entered by the user.

Numerous variations are possible using a system of paired devices, such as shown in FIG. 1A. For example, rather than have the roaming device 120 communicate a password or other data item to "unlock" resource target 138, the associated computing device 130 may perform a lock (i.e. require password or encryption key) upon being activated and detecting that the roaming device 120 is not present. Thus, presence of the roaming device 120 maintains the device in an unlocked state, and its absence causes the device to perform the lock, or provide some added security feature to guard the target resource 138.

According to an embodiment, one or both devices of the pairing include user-interface features 125, 135 to enable user-input to specify configurations of how various security features are implemented. According to one or more embodiments, the user-interface 135 of the associated computing device 130 may be operated to specify anyone or more of the following functions: (i) trigger or set a configuration where the security implement component 136 is activated to use data from the roaming device 120 in enabling or disabling one or more security features; (ii) identify the roaming device 120, or the data item or password that is to be communicated from the roaming device 120 and used by the security implement component 136 of the associated computing device 130; (iii) identify the target resource 138, which may, depending on the implementation, correspond to a user-interface that enables or disables access to use of the device, application, database or data collection, or account managed on the associated computing device 130; (iv) enable or disable other functions, such as policies or follow-on consequential actions from failure or compliance of the communication received from the roaming device 120 (e.g. whether the user can perform a manual override, the number of times the user can try and use the trigger device, what happens to the associated device if a device other than the trigger attempts to perform an unlock etc.).

In one embodiment, the user-interface 125 of the roaming device 120 may receive input to identify and remotely cause implementation of the same function or functions described above for the user-interface 135 of the associated computing device 130. The user may operate the roaming device 120 to enter input, which user-interface 125 then translates into configuration input for implementation by the security implement 136 or user-interface 135 of the associated computing device 130. The configuration input may be communicated to the associated computing device 130 using the local wireless communication ports 122, 132 of each device. The configuration input may be communicated during, for example, a synchronization or data transfer process. As an alternative or additional embodiment, the user-interface 125 may be operable to set the configurations of the target device locally, or in tandem with the associated computing device 130. For example, the user-interface 125 may be operated to specify the policy in which the identifier or data item for unlocking the target resource 138 of the associated computing device 130 is communicated only when the roaming device 120 itself is unlocked.

In another variation, the roaming device 120 may be equipped with biometric verification, such as a fingerprint scanner. In one embodiment, roaming device 120 may communicate the security key 129 to unlock the associated computing device 130 (or unlock or otherwise enable access to its targeted resource 138) when biometric verification is present.

Figure 1B:
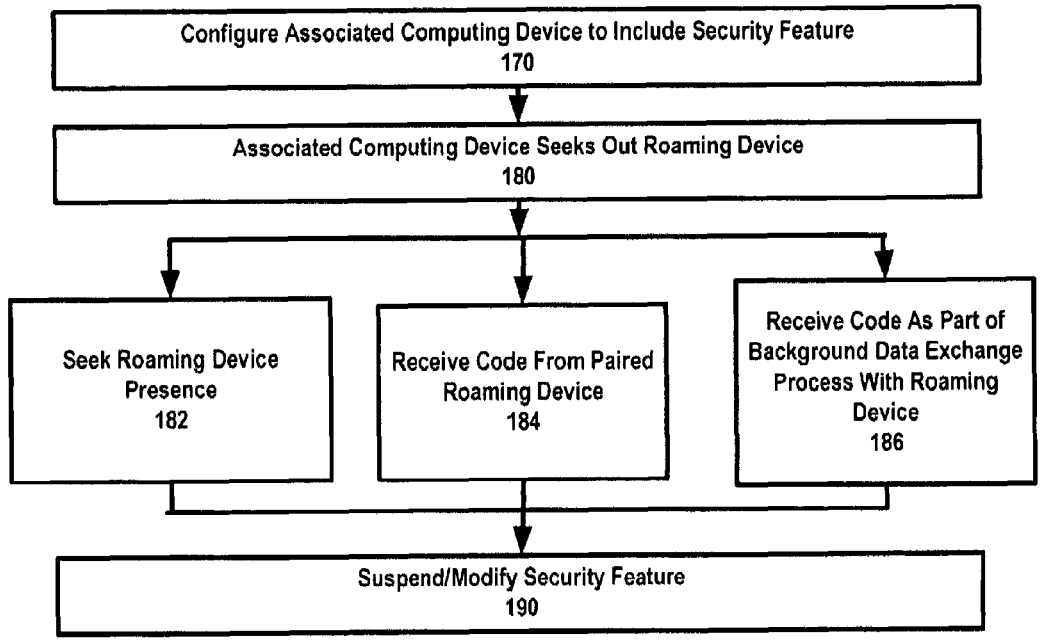
FIG. 1B illustrates a method for communicating data to suspend or bypass a security feature between paired devices, such as shown and described with an embodiment of FIG. 1A, under an embodiment of the invention.

FIG. 1B illustrates a method for enabling use of a roaming device to suspend or bypass a security feature a paired or associated computing device, under an embodiment of the invention. A method such as described with FIG. 1B may be performed using a system such as described with FIG. 1A. Accordingly, an embodiment such as described with FIG. 1B may be performed using a cellular telephony device (e.g. smart phone) as the roaming device 120, and a laptop or other non-cellular device as the associated computing device 130. However, other types of devices may also be used to implement an embodiment of FIG. 1B.

In a step 170, the user may configure associated computing device 130 to include a security feature that secures access or protects data on the associated computing device 130. According to one or more embodiments, the security feature is a password or security key requirement to grant user-access to data and/or resources on the associated computing device 130. In order to implement the security feature, the user may provide configuration information through operation of user-interface 135 on the associated computing device 130. Alternatively, the paired devices may be configured so that the user can enter the configuration information through operation of user-interface 125 on the roaming device 120. Absent the security feature being suspended or bypassed, one or more embodiments provide that the associated computing device may be maintained, for example, under one or more of the following protective measures: (i) denying access to any data or application on the associated computing device 120, (ii) encrypting at least some of the data stored on the computing device, and (iii) maintaining the associated computing device 130 in a non-operable state.

As part of performing step 170, the user may identify the roaming device 120 to the associated computing device 130. For example, the user may enter the name, profile or other identifier of the roaming device 120 as part of the configuration for the associated computing device 130.

Subsequent to the associated device 130 being configured, step 180 provides that the associated device 130 seeks out the roaming device 120 in order to suspend or bypass a security feature. The associated computing device 130 may seek out the roaming device 120 using a local wireless communication port. Step 180 may be performed in response to a designated event or condition. Depending on the implementation, the associated computing device 130 may simply seek the presence of the roaming device 120, or alternatively, seek a more sophisticated communication or communication exchange from the roaming device 120 (e.g. password or encryption key). As such, step 180 may be performed in any one of several ways, depending on the type of communication exchange that is to occur between the devices. Different variations are described by sub-steps 182, 184 and 186, for performing step 180.

In sub-step 182, the associated computing device 130 seeks only the presence of the roaming device 120. In one implementation, the associated computing device 130 scans for the identifier (e.g. name) of the roaming device 120, as communicated by the roaming device across a medium of the local communication port 132. For example, the associated computing device 130 may scan for a Bluetooth device name or identifier of the particular roaming device 120. The identifier communicated by the roaming device 120 across the local communication port 132 (e.g. Bluetooth device name) may be all that the associated computing device 130 needs to bypass or otherwise suspend a password requirement or other security feature.

In another variation, sub-step 184 provides that a more sophisticated level of security communication may be sought by the associated computing device 130. The two devices may be configured so that the roaming device 120 communicates a security code to the associated computing device 130. In one embodiment, the security code may correspond to a password or encryption key.

In sub-step 184, one implementation provides that the password for the associated computing device 130 or a substitute identifier (e.g. identifier 127) may be communicated automatically as part of the user operating the roaming device 120. For example, the user may operate a cellular phone, which then seeks (or responds to) the associated computing device 130, and communicates the password for the security feature once it finds that device. So long as the user attempts to access the associated computing device 130 for a given duration following use of the cellular device, one embodiment provides that the associated computing device is unlocked and available for use.

As an alternative variation, in sub-step 186, the security code (e.g. identifier 127 or a password) may be communicated as part of one or more background data exchange processes between the two devices. For example, as described with other embodiments, the roaming device 120 and the associated computing device 130 may perform background synchronization processes and data transfers. For a given duration after such communications, the password requirement of the security feature may be suspended for the user.

In an embodiment, an exchange such as described by sub-steps 182, 184 and 186, may be performed by (i) the associated computing device 130 being made active for user-operation (e.g. powered from a sleep state); (ii) the associated computing device 130 performing an automatic scan for the roaming device 120 using the short-range (or local) wireless communication port; (iii) the associated computing device detecting the roaming device by name, profile or other identifier. As an alternative, upon finding the roaming device 120, the associated computing device 130 may receive (through a communication exchange) the security code for suspending the security feature. In one implementation, the roaming device 120 must also be in an activated or communicative state for the security code 129 to be transferred. Furthermore, in the exchange, one or more embodiments also provide that data corresponding to the state of use of the roaming device 120 is transferred to the associated computing device.

Upon detecting the roaming device 120 and/or receiving the security code, step 190 provides that a security feature on the associated computing device 130 is suspended, bypassed or otherwise modified. For example, alternative variations provide that the security feature is reduced (e.g. requiring use of password but not encryption key). In an embodiment, this step may result in a suspension or reduction of one or more user-actions that would otherwise be required by the affected security feature in order to access the associated device data, records, applications etc. This may be done by the associated computing device 130 using the code to perform an action that corresponds to a manual action that the security feature would otherwise require from the user. In one embodiment (such as described with FIG. 1C), the associated computing device 130 may suspend a security feature, such as a requirement for the user to enter a password, when the roaming device 120 is detected on the local wireless communication port 132. For example, the associated computing device 130 may detect the roaming device by name or by identifier using the local wireless communication port 132. In this way, the roaming device 120 may act as a "key" that unlocks or provides access to the associated computing device 130.

In an embodiment, the associated computing device 130 may recognize or use the presence of the roaming device 120, or the security code received from the roaming device, to enable the user to access a collection of records, or a database. Alternatively, the action performed by the associated computing device 130 may be to simply suspend the requirement for the user to enter the password as a result of receiving the code from the roaming device 120. The end result, under one implementation, may correspond to the associated computing device 130 (i) requiring a password when the roaming device 120 is not in proximity to it, and (ii) not requiring the password when the roaming device is in proximity to it (i.e. in range of local wireless communication). Thus, the roaming device 120 may act as a password key when in proximity to the associated computing device 130.

As an example of how an embodiment of FIG. 1B may be implemented, when the security feature is in place, the computing device 130 may deny access to some or all records, databases, applications, accounts etc. In response to detecting, for example, a physical user-interaction from the user, the device may activate with the security feature in place. The device 130 may make a determination as to whether the roaming device 120 that is paired with is present, or seek to receive a security key or perform a synchronization with the roaming device 120. A local or short-range wireless communication port may be used. If the roaming device 120 is not present or not providing the required communication, the associated computing device 130 may maintain the security features in place, and thus deny access to the protected data or resources. Else, the associated computing device 130 may satisfy one or more security requirements, and provide access to the otherwise protected data or resources (e.g. as described with step 180 and its sub-steps).

Figure 1C:
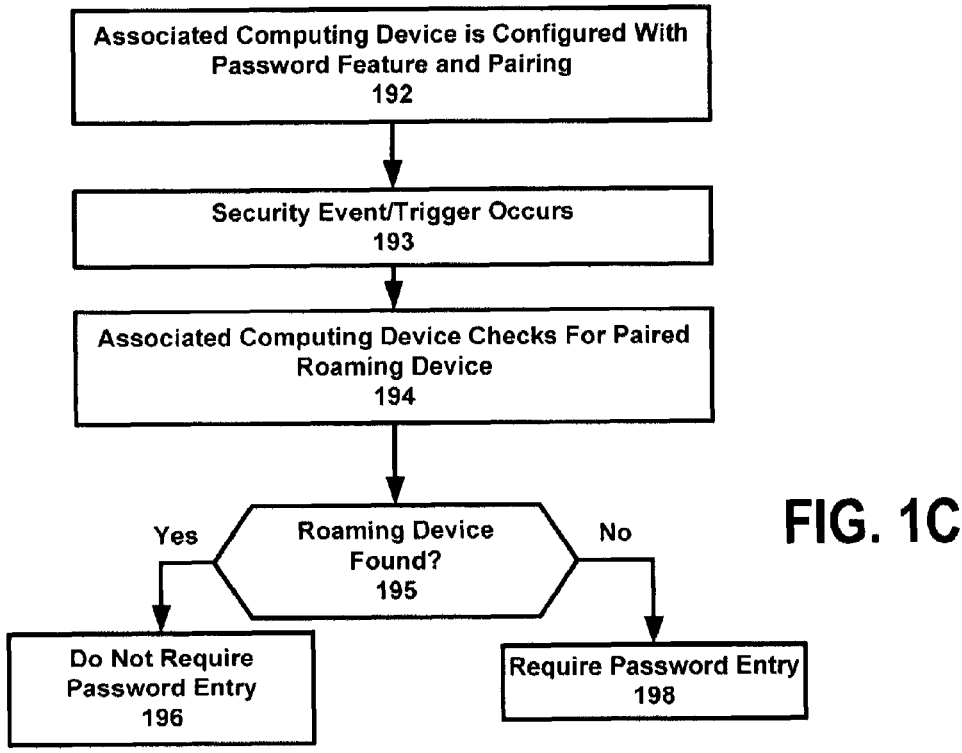
FIG. 1C illustrates a more detailed method for using a roaming device to control a security feature on an associated computing device, in accordance with one or more embodiments described with FIG. 1A and FIG. 1B.

FIG. 1C illustrates a more detailed method for using a roaming device to control a security feature on an associated computing device, in accordance with one or more embodiments described with FIG. 1A and FIG. 1B. A method such as described with FIG. 1C may be performed using a cellular telephony device as the roaming device 120, and a laptop or less mobile computing device as the associated computing device 130.

In step 192, the associated computing device is configured with a password security feature and pairing. The password security feature may be implemented to enable a user to access and use the associated computing device 130. Alternatively, the password feature may be specific to an application, account maintained on the associated computing device 130, or other resource maintained or made available through the associated computing device 130. The pairing may be made by, for example, identifying the roaming device 120 as a trusted device to the associated computing device 130. In one implementation, standard protocols or processes available with Bluetooth devices may be used to configure the two devices as being trusted. For example, as described above, a trusted relationship may be established by a passkey being generated on one device, and manually entered in the other device. The passkey may then be used to generate subsequent security codes.

Subsequent to the associated computing device 130 being configured, a security event or trigger may occur in step 193. In one embodiment, the security event may correspond to a user attempting to use the associated computing device 130. For example, the associated computing device 130 may be responsive to a physical interaction by a user. Such an interaction may correspond to the user (i) unfolding housing segments of the associated computing device 130 when it has a laptop configuration, (ii) powering on or activating the associated computing device 130, (iii) inputting a key entry or stroke, or (iv) otherwise manipulating the device to cause the trigger for activating the password security feature.

Other security events or triggers are also contemplated. Under another embodiment, the event trigger may be a passage of time between when a user last operated the associated computing device 130, or between the last time the associated computing device 130 has performed a security check. Still further, the security event may occur each time the associated computing device 130 is powered off or down.

Step 194 provides that the associated computing device 130 checks for the paired roaming device 120, in response to the security event or trigger. In one embodiment, presence detection is performed, where the associated computing device 130 checks to determine whether it sees the roaming device 120 on the local wireless communication port (e.g. Bluetooth). However, as described with other embodiments, a more sophisticated or complex communication exchange may also be required and/or performed (e.g. encryption key exchange, synchronization). When performing presence detection, the associated computing device 130 may use a local wireless communication port 132 to confirm that the roaming device 120 is in a designated range, defined by the operative range of that wireless port. Thus, it is possible for the roaming device 120 to be off, so that its presence is not noticed by the associated computing device 130.

In step 194, a determination is made as to whether the roaming device 120 is detected or otherwise present in step 195. If the roaming device 120 is determined to be present, step 196 provides that the requirement for password entry is suspended. The user can access the associated computing device 130, application or resource without entering a password. If the determination is that the roaming device 120 is not present, the password is required to be entered.

A method such as described with FIG. 1C enables a designated roaming device to act as a security key for an associated computing device. Such an embodiment may facilitate convenience of use of the computing device 130, particularly when the two devices are paired and used together.

While embodiments described above provide for a roaming device that corresponds to a device with roaming connectivity through wireless WAN, one or more embodiments provide for a method such as described with FIG. 1B of FIG. 1C to be performed with use of any device that can transmit or wirelessly communicate a password or identifier that can substitute for a password. For example, with respect to an embodiment of FIG. 1B, the roaming device may correspond to any Bluetooth device that can transmit an identifier.

Figure 2:
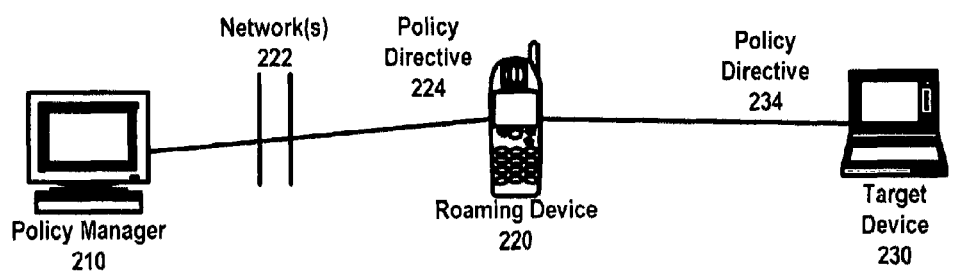
FIG. 2 illustrates a system where a targeted computing device is directed to implement a policy from a remote policy manager through use of an intermediate roaming and connected device, under an embodiment of the invention.
Figure 4:
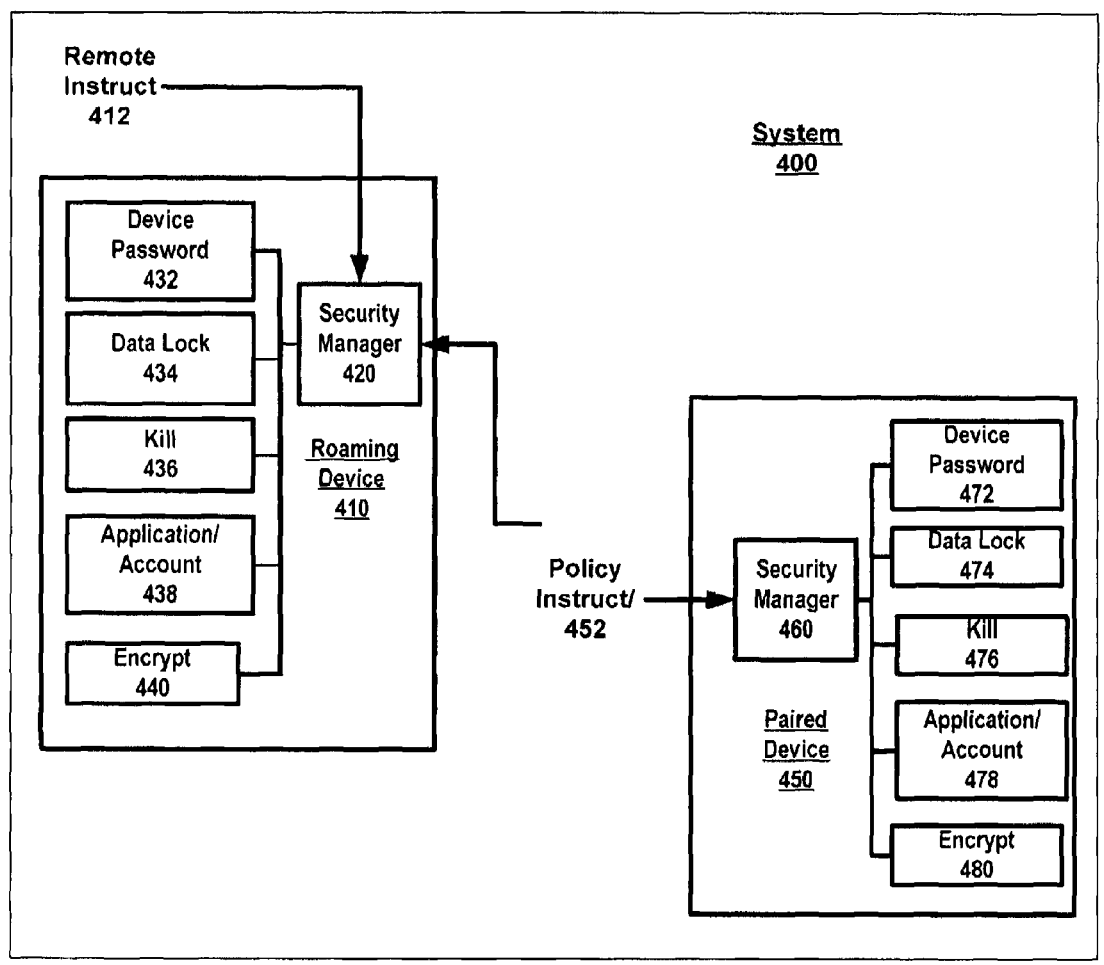
FIG. 4 illustrates a system of paired devices in which a security policy may be distributed amongst a connected roaming device and a paired target device, under an embodiment.
Figure 5:
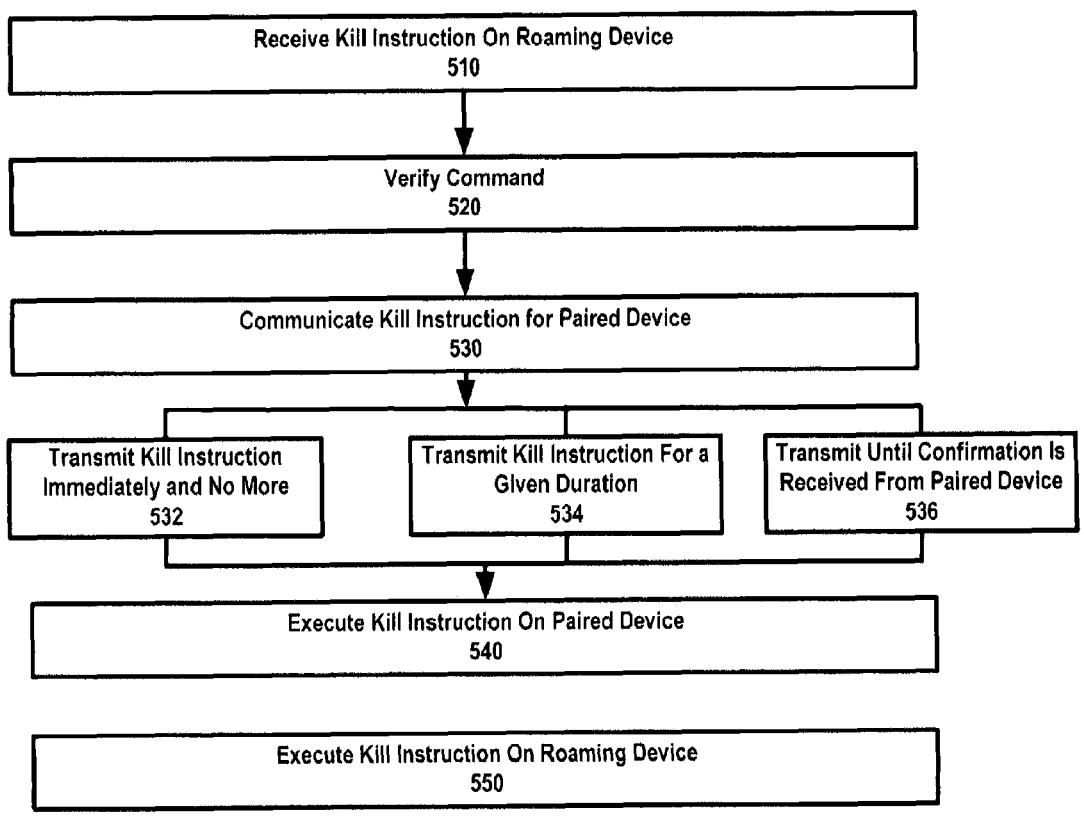
FIG. 5 illustrates an embodiment in which one or more of the devices of system 400 are killed, under an embodiment of the invention.

As described with an embodiment of FIG. 4 and FIG. 5 however, the roaming device 120 for performing a method of FIG. 2 may correspond to a roaming and connected device (e.g. capable of receiving cellular or other wireless WAN communications) that can be remotely instructed to implement and distribute security policies, including policies to self-kill or kill the associated computing device 130. In this way, if the roaming device 120 is misappropriated, access to one or both devices can still be safeguarded.

Remote Policy Implementation Using Paired Devices

FIG. 2 illustrates a system where a targeted computing device is directed to implement a policy from a remote policy manger, through use of an intermediate roaming and connected device 220, under an embodiment of the invention. In an embodiment, a system such as shown by FIG. 4 includes a roaming device 220, the target device 230, and a policy manager 210. The roaming device 220 may correspond to a mobile computing device, such as a cellular telephony device (e.g. smart phone or mobile manager). The target device 230, however, may lack the ability to directly communicate with the policy manager 210. For example, the target device 230 may lack the network connectivity when roaming outside of a wireline connection or beyond the reach of a WiFi or other short-range wireless network. As will be described, a policy manager 210 may initiate a communication, or sequence of communications, using the roaming device 220 in order to direct or otherwise cause the target device 230 to implement or configure a policy or perform a policy action on the targeted device 230.

As described with an embodiment of FIG. 1A and FIG. 1B, for example, the roaming device 220 and the targeted device 230 may be paired devices, so that each device is configured to recognize or detect the presence of the other device. In one embodiment, presence detection amongst the paired devices is performed using a local wireless communication link, such as provided by a Bluetooth or wireless USB port. Additionally, the paired devices may have an established relationship for transferring or exchanging data with each other. An embodiment such as described with FIG. 2 enables the targeted device 230 to receive a policy directive originating from the policy manager 210, without directly communicating with the policy manager 210. For example, the targeted device 230 may lack the wireless WAN connectivity of the roaming device 220, and thus not be reachable at a given time when the policy implementation is desired.

Still further, one or more embodiments provide that the roaming device 220 and the targeted device 230 are paired to perform one or more of (i) background synchronization processes to transfer records and other data; (ii) transfer profile information about a user of both devices; and/or (iii) perform data exchange and/or synchronization to transfer state information of one device to the other device. In the latter case, for example, the state of use of the roaming device 220 may be communicated to the target device 230, in response to the target device 230 being activated and brought into communication with the roaming device. With regard to such synchronization processes, the roaming device 220 and the targeted device 230 may use local wireless communication ports to recognize or detect when the other device of the pairing is in proximity for data transfer, and then perform the synchronization/data transfer processes automatically. In one implementation, the background synchronization processes may be performed even when the devices are "off", and/or in a manner that is not noticeable to the user. With regard to the state transfer/synchronization, under one implementation, when the targeted device 230 is switched to an operative or "on" state, that device seeks the roaming device 220. If the roaming device 220 is determined to be active (in an operable state) and in proximity (as determined by the local wireless communication port), state information indicating a state of use of the roaming device 220 is transferred to the targeted device 230, so that at least some of the state of use of the roaming device is transferred to the targeted device 230.

In an embodiment, the policy manager 210 communicates with the roaming device 220 through use of one or more networks 222. The policy manager 210 may correspond to a terminal, work station, administrative station, server or other facility from which policies may be directed or otherwise communicated. In one embodiment, the policy manager 210 includes Internet connectivity, and transmits its communications to a cellular network which then relays the communication to the roaming device 220. The policy manager 210 may send a policy directive 224 across network(s) 222 (e.g. Internet and cellular broadband). According to one or more embodiments, the policy directive 224 may correspond to any one or more of: (i) a trigger to cause implementation of a particular policy on either the roaming device 220 or the associated device 230; (ii) data to enable either the roaming device 220 or the associated device 230 to select or use a particular policy stored on one or the other of the paired devices; (iii) instruction or configuration data to cause either one or both of the paired devices to implement a particular policy in a particular manner; and (iv) instruction that comprises at least a portion of a policy that is to execute on either of the paired devices.

In response to receiving the policy directive 224, the roaming device 220 communicates an outbound directive 234 to the targeted device 230. The outbound directive 234 may specify an instruction, configuration or selection for a policy that is to be implemented on the associated device 230. In an embodiment, the outbound directive 234 is based on, or corresponds to the directive 224. Thus, for example, the mobile computer 220 may forward a communication from the policy manager 210 that specifies or selects a particular policy implementation. Alternatively, the directive 234 may differ from the directive 224, in that the policy implemented or specified by each directive may be different. But the policy implemented by the directive 234 may be based on information communicated in the directive 224. For example, the directive 224 may specify a condition (e.g. highest security breach). The mobile device 220 may implement its own policy to safeguard its data, and send the outbound directive that (i) communicates the condition to let the target device 230 respond with policy implementation, and/or (ii) communicates an instruction or other data to select or enable a particular policy implementation on the associated device 230 for the identified condition.

According to an embodiment, the outbound directive 234 may be triggered by the inbound directive 224, as received from the policy manager 210. For example, the roaming device 220 may send outbound directive 234 instantly in response to receiving the directive 224. Alternative, the outbound directive 234 may be queued or delayed in transmission for the associated device 230. For example, the roaming device 220 may receive the directive 224 at a time where the targeted device 230 is not detected as being in proximity or communication with the roaming device 220. The roaming device 220 may then communicate the outbound directive 234 at a subsequent instance when the targeted device 230 is detected and/or placed in communication using the local wireless link.

Thus, as described with one or more embodiments of FIG. 2, the policy manager 210 initiates a sequence of communications, and specifies the policy implementation on the associated device 230 through use of an intermediate device (i.e. roaming device 220). Among other benefits, an embodiment such as described enables a policy manager to communicate policy data or information to devices that do not have internal resources to directly receive the communications. For example, the target device 230 may not be able to receive wireless WAN communications at the time a particular policy is desired to be implemented.

As with policy directive 224 from the policy manager 210, the policy directive 234 transmitted from the roaming device 220 may correspond to one or more of (i) a trigger to cause implementation of a particular policy on the associated device 230; (ii) data to enable the associated device 230 to select a particular policy stored on that device; (iii) instruction or configuration data to cause the associated device 230 to implement a particular policy in a particular manner; and/or (iv) instruction that comprises at least a portion of a policy that is to execute on the target device. In one embodiment, the target device 230 implements a policy in response to receiving the directive 234 from the roaming device 220. In this way, for example, the roaming and connectivity functionality of the roaming device 220 may be used to communicate a policy directive that originates at least in part from a remote policy manager 210, even when the target device 230 is not directly reachable at the time when the policy is to be made effective. Under one embodiment, a policy may be "pushed" onto the target device 230 without the need to connect the associated device 230 to the Internet, as the policy directive is relayed from another device (e.g. the roaming device 220).

While FIG. 2 illustrates an embodiment in which a mobile computing device is used as an intermediary for the associated computing device 230 (e.g. laptop), other kinds of computing devices are contemplated with one or more embodiments. According to other embodiments, the roaming device 220 may be provided by any device that is capable of roaming and remaining connected to receive and handle network communications from other computers. Examples of devices that are alternatives to mobile computing device shown in FIG. 2 include laptops with internal capabilities to receive cellular data (e.g. internal cellular module and radio), laptops with external accessory capabilities to receive cellular data, car kit stations, and personal digital assistants and media players with wireless WAN capabilities. Furthermore, while embodiments described herein provide for the use of cellular networks to enable connectivity with the roaming and connected device, one or more embodiments may be implemented through localized, broadband networks that enable portable computing devices to roam through a given location. For example, an intermediary device may correspond to a laptop computer with capabilities to receive wireless fidelity (WiFi) communications at a given location, such as at an enterprise location or in a city that includes WiFi grid. The roaming device 220 may correspond to a device that can move continuously from one access point to another in a WiFi domain or network, or alternatively to a device that can be detected remotely each time it passes through an access point (even when intermittently connected). As another alternative, a computer capable of communicating with a WiMAX (IEEE 802.16) networked region may provide the roaming device 220.

Figure 3A:
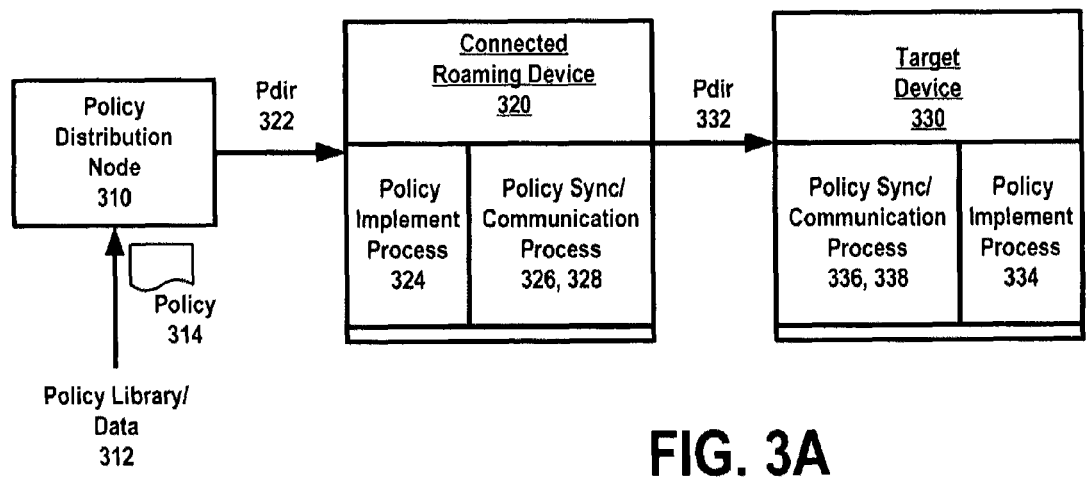
FIG. 3A is a simplified diagram illustrating processes that are executed on an intermediary roaming device and on a paired target device, in a schematic to enable a policy distribution node to instruct or specify a policy directive on the target device, under an embodiment of the invention.

FIG. 3A is a simplified diagram illustrating processes that are executed on an intermediary connected roaming device 320 and paired target device 330, in a schematic to enable a policy distribution node 310 to instruct or specify policy implementation and/or policy decisions on the paired target device 330, under an embodiment of the invention. An embodiment of FIG. 3A assumes the target device 330 is not capable of directly receiving communications from the policy node 310, at least at a particular time when the policy implementation is desired. The policy distribution node 310 may correspond to a policy manager (such as shown and described with an embodiment of FIG. 2), or a server or service that distributes policies to individual accounts or sets of devices. For example, under one implementation, a third-party security firm may remotely implement security features on a group of devices that belong to an individual or account. The connected roaming device 320 may correspond to a device that has cellular connectivity (e.g. cellular smart phone or laptop) or other devices such as described elsewhere in different connectivity environments (e.g. WiFi, WiMax). The paired target device 330 may correspond to any computing device that is not capable of receiving communications form the policy node 310 at a given time period when a policy instruct is to be communicated or implemented.

In an embodiment, the policy node 310 may communicate a policy directive 322. The policy directive 322 may be communicated for the roaming device 320, for the paired target device 330, for both devices in tandem. Alternatively, the policy directive 322 may be for a class of devices (e.g. all devices that receive the communication and belong to a particular account or person). The policy directive 322 may comprise of instructions and/or data to enable one or more of policy implementation, configuration, or selection or configuration on any downstream device that is to be affected by the directive 322.

According to one or more embodiments, the roaming device 320 may execute a policy implementation process 324 and one or more of a policy synchronization processes 326 and/or communication processes 328. Likewise, the paired target device 330 may be capable of executing a policy synchronization process 326 or a communication process 338. In one embodiment, the roaming device 320 and the target device 330 combine to perform policy synchronization processes 326, 336 when similar or same policy implementations and configurations are to be shared. For example, the paired devices 320, 330 may be operated to share one common security feature, such as a single password that can unlock both devices. If the user specifies a change in the password on one device, or suspends the password usage on that device, the synchronization processes 326, 336 may communicate the change to the other device. The policy synchronization processes 326, 336 may be performed as needed, and/or in connection with synchronization processes for transfer of other information and data. For example, policy synchronization processes 326, 336 may be performed concurrently with processes to synchronize records or state of use information between the devices.

As an alternative or additional feature, the policy communication processes 328, 338 on each of the respective devices may be performed to enable one device to direct the policy action on the other device, or to cause a policy implementation on the target device 330 that is different than the one implemented on the device 320. For example, the security policy on the target device 330 may be more stringent than on the roaming connected device 320, or the roaming connected device 320 may specify a one-time device specific action on the paired target device 330 (e.g. execute kill pill).

Under an embodiment, the policy node 310 has access to a policy library 312 comprising instructions and features for implementing or configuring rules of operation on a particular device. When a given policy 314 is to be distributed, policy node communicates the directive 322 to the roaming device 320. The directive 322 may specify the policy 314, configuration of policies 314, or even include programming code to execute the policy 314 on the roaming device 320. As an alternative, the directive 322 may be intended for a class of devices that the roaming device 320 may communicate with, and/or the paired target device 330 of that device. In one embodiment, the directive 322 results in the roaming device 320 and the paired target device 330 implementing like or similar polices or policy configurations in tandem. Receipt of the directive 322 may trigger the policy implementation process 324 to select, configure or otherwise implement some or all of the given policy 314.

In addition to triggering or causing the transmission of the outbound directive 332, the directive 322 from the policy node 310 may result in the roaming device 320 implementing locally the given policy 314, either independent or in tandem with a policy implemented on the target device 330. Thus, under one implementation, the roaming device 320 may simply act as a pass through or relay in communicating the given policy 314 (or aspects of it) originating from the policy node 310 to the targeted device 330. Under another implementation, the roaming device 320 communicates what the directive from the node 310 is, while at the same implementing its own policy (as identified by the directive 324) in tandem with the targeted device 330.

In addition, the directive 322 may direct or cause the synchronization process 326 or communication process 328 to communicate directive 332 to the paired target device 330. The directive 332 to the target device 330 may correspond to the directive 322 issued from the node 310, or alternatively the two directives 322, 332 may be related but different. For example, directive 332 may be selected or otherwise based on the directive 322 that is issued from the node 310, or directive 332 may be based on the policy executed on the connected device 320. As another example, the node 310 may specify different policies or policy configurations in its directive 322 to the roaming device 320.

According to an embodiment, on the roaming device 320, the policy synchronization process 326 may be performed in connection with a corresponding server or remote policy. For example, a security policy may be altered on a server for a given roaming device. Subsequently, the roaming device and server perform a policy synchronization process, in which policy changes, configurations or new specified policies from the node 310 are synchronized onto the roaming device 320. In this way, the directive 322 may be an instruction received as part of a synchronization process between the node 310 and the roaming device 320. Likewise, the directive 332 sent to the paired device 330 may also be part of a synchronization process between the paired device 330 and the roaming device 320.

Figure 3B:
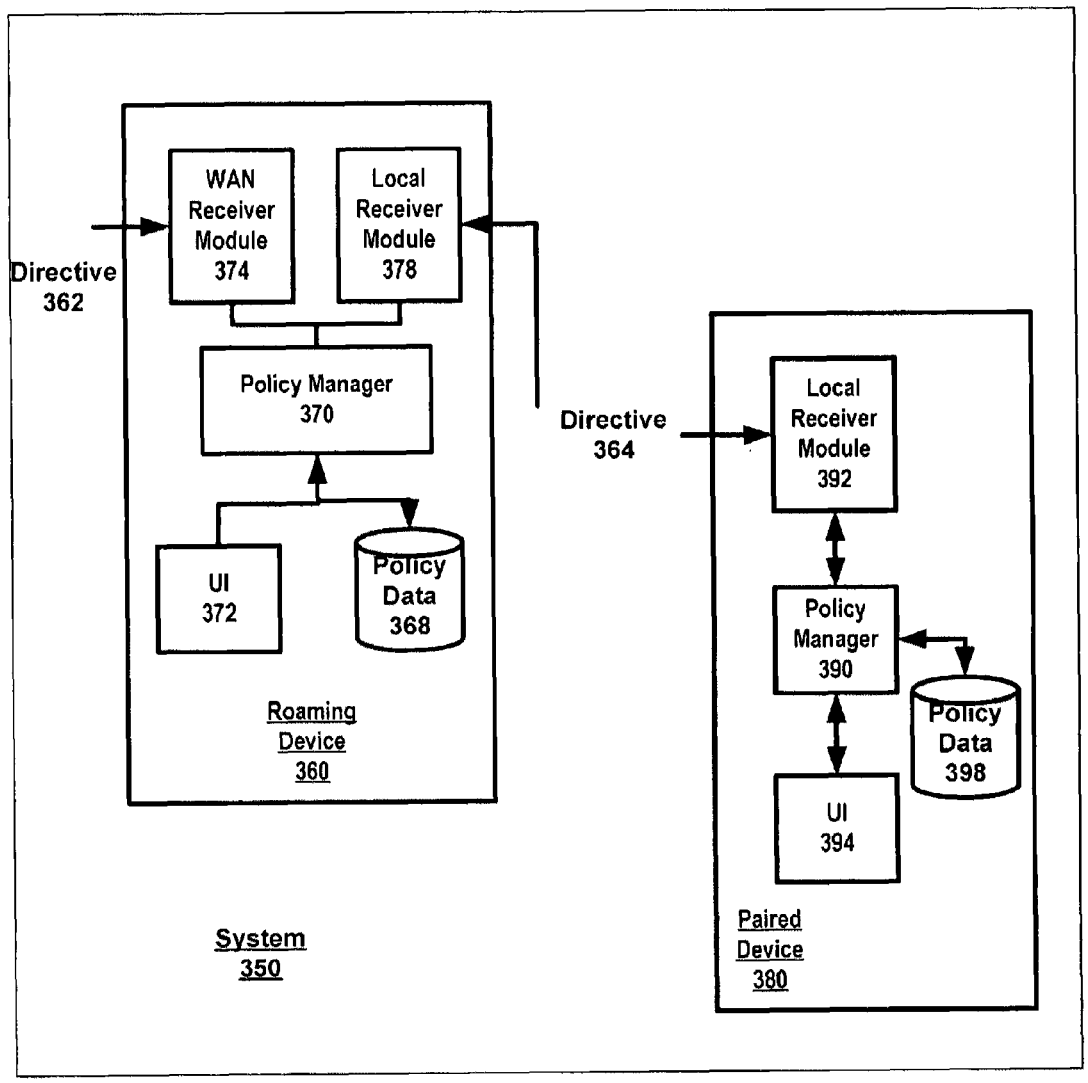
FIG. 3B is a block diagram illustrating a system of paired devices that perform processes such as described with an embodiment of FIG. 3A.

FIG. 3B is a block diagram illustrating a system of paired devices that perform processes such as described with an embodiment of FIG. 3A. In FIG. 3B, a system 350 includes a roaming device 360 and a paired device 380. The roaming device 360 includes modules corresponding to a policy manager 370, a WAN receiver 374, and a local communication port 378. A user-interface module 372 may also be provided on the roaming device 350. The policy manager 370 may use a policy database 398 to retrieve policy data and instructions. The paired device 380 includes modules corresponding to a policy manager 390, a local communication port 392, and a user-interface 394. The modules on each of the devices 360 and 380 may be provided by a combination of hardware and logic or programming. For example, the policy managers 370 and 390 may be provided by corresponding processors that execute policy instructions, while the WAN receiver 374 may be provided by a combination of a radio processor, radio transmitter and receiver, and memory resources for radio communications. More detailed descriptions of some hardware components that can be used to implement the modules described are provided with an embodiment of FIG. 6.

The policy managers 370, 390 may perform the policy implementation processes 324, 334 (FIG. 3A). According to an embodiment, the policy managers 370, 390 also control implementation of either the synchronization processes 326, 336 (FIG. 3A) or the communication processes 328, 338 (FIG. 3A), to ensure the processes are performed in accordance with the implemented policies. For example, policy managers 370, 390 implement policies that dictate what data and/or files may be synchronized or shared between the paired devices, and what (if any) applications that one or both devices may load and execute.

As described with other embodiments, the roaming device 370 may issue a directive 364 for the paired device 380. In one embodiment, the directive 362 received by the roaming device 360 is implemented on the roaming device, and then communicated to the paired device 380 as part of a synchronization process. In another implementation, the directive 364 may be communicated to the paired device 380 independent of a corresponding policy implementation on the roaming device 360. The roaming device 360 may also communicate the directive 364 without implementing any policy as a result of the directive 362 it receives.

As a result of the directive 364, the policy implemented on the paired device 380 may change. In an embodiment, the user-interface module 394 may provide the user with information on policy implementation, including actions that are to be taken, and enable the user to accept, decline or modify policy or policy changes. For example, if a security policy is changed on the paired device 380, the paired device 380 may display, through execution of the user-interface module 394, information corresponding to the policy implemented, the policy changes made and/or any actions that may be taken as a result of a policy implementation. The user may then provide input to make a policy change or configuration. For example, the user may elect to suspend any of the policy implementation, changes or actions, or perform other modifications or specify a new policy altogether.

According to an embodiment, the roaming device 360 may also provide the user-interface 372 for enabling the user to view policy implementation and changes resulting from received directives. As on the paired device 380, the user may, through operation of the user-interface 372, enter input that affects the policy implementation or changes on the roaming device 360. Additionally, one or more embodiments enable the user to enter input that (i) configures existing policy implemented on the paired device 380, or (ii) specifies alterations or changes that can be made to the policy implemented on the paired device 380 when the directive 364 is issued. In this way, an embodiment provides that the policy user-interface 372 on the roaming device can influence or control policy implementation on the paired device 380.

Security Policy Implementation

In various situations, it may be beneficial to communicate security policies or actions from a remote policy manager or node. For example, in a situation where a combination of devices (e.g. cell phone and laptop) are stolen or lost, a user may wish to lock or destroy data on both devices. As another example, the administrator of an enterprise may wish to remotely control security settings on various devices based on a perceived threat level or condition.

FIG. 4 illustrates a system of paired devices in which a security policy may be distributed amongst a connected roaming device and a paired target device, under an embodiment. A system 400 includes a connected roaming device 410 and a paired device 450. As with some embodiments described with FIGS. 1A-FIG. 3A, devices 410, 450 of may have an established association or relationship. The roaming device 410 includes a security manager module 420 that implements one or more security policies or actions, and/or communicates security policies to the paired device 450. Likewise, the paired device 450 includes a security manager module 460 to implement its security policies and actions.

In an embodiment of FIG. 4, the security manager modules 420, 460 of each device 410, 450 in the pairing is capable of performing actions in accordance to the implemented security polices. In an implementation such as shown by FIG. 4, the security policies include (i) device password feature 432, 472, (ii) data locking feature 434, 474, (iii) kill action 436, 476, (iv) application or account security manager 438, 478, and/or (v) encryption feature 440, 480. Implementation of the device password feature 432, 472 on either device 410, 450 may specify when and/or what resources are to be password protected, as well as the rules governing password selection (e.g. number of characters, how often it is to be changed, whether the password can be shared or exchanged between the paired devices). The data locking features 434, 436 may specify select data sets, by type, location (e.g. database of records) or otherwise, that are to be inaccessible, or accessible only through a combination of other security features (e.g. password or encryption). The kill action 436, 476 may be executed on one or both devices to make that device inoperable, or to destroy all data on that device. The application or account security manager may implement one or more security features (e.g. password, access deny) on a safeguarded application, or on an account that runs on one or both devices (e.g. email account). The encryption feature 440, 480, when executed on one or both devices, may cause select resources on that device to be encrypted.

According to an embodiment, the security manager 420 of the roaming device 410 receives an instruction 412 from a remote source (e.g. a policy manager). Under one implementation, the instruction 412 results in security policy implementation on the roaming device. Accordingly, instruction 412 may specify (i) selection of any one of the policies 432-440, (ii) configuration or implementation of any one of the policies 432-440. In addition, or as an alternative, the instruction 412 may specify security policy implementation on the paired device 450. The instruction 412 may direct the roaming device 410 to send an instruction 452 to the paired device 450, or the roaming device 410 may be configured to send the instruction 452 automatically in response to receiving the instruction 412, or in response one or more events. Examples of such events include detecting the presence of the paired device 450 after receiving the instruct 412, and/or performing a synchronization process such as described with an embodiment of FIG. 3A.

In response to receiving the instruction 452, the paired device 450 may implement any one of the policies 472-480 specified by that instruction. The instruction 452 may select one policy over another, and/or enable or configure any of the policies 472-480.

While an embodiment described with FIG. 4 describes that the security policy implementation on the roaming device 410 is performed in tandem with the security policy implementation on the paired device 450, one or more embodiments provide that the roaming device 410 simply relays or generates the outgoing instruction 452 from the inbound instruction 412. Thus, the roaming device 410 may not have to perform any policy implementation, and instruction 412 may be directed to causing only the target device 450 to implement or configure a particular policy.

FIG. 5 illustrates an embodiment in which one or more of the devices of system 400 are killed, under an embodiment of the invention. The kill policy 436, 476 (sometimes referred to as a "kill pill") on each of the devices 410, 450 may result in each device performing actions such as destroying all records and user files, and/or rendering the device inoperable. The kill policies 436, 476 may be implemented by software, firmware, hardware, or a combination thereof. For example, in one implementation, the kill policies 436, 476 include an application that seeks specific folders and erases all data contained in them. In another implementation, the kill policies 436, 476 may be implemented with an embedded switch mechanism that physically disables the respective device.

A method such as described in FIG. 5 may be implemented when a condition arises that requires data on devices of system 400 to be protected. For example, the paired devices of system 400 may be come lost, stolen, or misappropriated. A method such as described with FIG. 5 may be performed with as assumption that the devices of the pairing in FIG. 4 are misappropriated together. For example, both devices may be in one carrying case that is stolen or lost.

In a step 510, a kill device instruction is received by the roaming device 410. As described with one or more embodiments, the instruction may be received over a cellular network, or through other kinds wireless network connectivity, depending on the capabilities of the roaming device.

In a step 520, the roaming device 410 verifies the command. For example, in order to recognize the command, a code may be embedded in the instruction that verifies or authenticates the source of the command. Thus, protective measures may be implemented before the device is killed.

Once verified, step 530 provides that the roaming device 410 communicates a corresponding kill instruction to the paired device 450. Step 530 may be performed through alternative sub-steps 532-536. In one sub-step 532, the roaming device 410 transmits the kill instruction to the paired device 450 immediately, and no more. In an alternative sub-step 534, the roaming device 410 transmits the kill instruction to the paired device 450 for a given duration of time, then stops. In still another alternative sub-step 536, the roaming device 410 transmits the kill instruction to the paired device 450 until confirmation is received that the kill instruction has been received and/or executed. The sub-step performed may be one of implementation design and/or user-preference.

Step 540 provides that the kill instruction is executed on the paired device 450. As a result, the paired device 450 may be made inoperable, and/or all data may be destroyed on it.

Step 550 provides that the kill instruction is executed on the roaming device 550. Depending on the sub-step performed for step 530, step 550 may be performed independently of step 540. For example, performance of step 532 may be futile if paired device 550 is not located by the roaming device 410. Such would be the case if the two devices are separated before the kill instruction is communicated to the roaming device 410. Alternatively, step 550 may be delayed on the roaming device 410 until confirmation that step 540 is initiated or completed on the paired device 550. As an alternative to executing kill instructions on one or both devices, an encryption setting or mode may be implemented on the paired device 450 to make that device all but unusable without the encryption key.

Numerous variations and alternatives to an embodiment such as described with FIG. 5 are possible. For example, in step 510, the roaming device 410 may be instructed to lockup, and attempt to kill the paired device 450. As an additional step, the roaming device 410 may thus implement a data lock policy 434, before or concurrently sending the kill instruction to the paired device 450. After paired device 450 is confirmed as receiving the kill instruction from the roaming device 410, roaming device 450 executes the kill instruction on itself.

While embodiments of FIG. 4 and FIG. 5 describe an embodiment for implementing security policies, other embodiments may similarly be applied to other kinds of policies (e.g. power management policies, device hardware settings etc.). With regard to an embodiment of FIG. 5, for example, the kill pill may be replaced with an action such as: (i) encrypting all data on each device, (ii) encrypting or destroying all data of a particular kind, such as emails or data on a device account, (iii) locking the device from use with software.

Hardware Diagram

Figure 6:
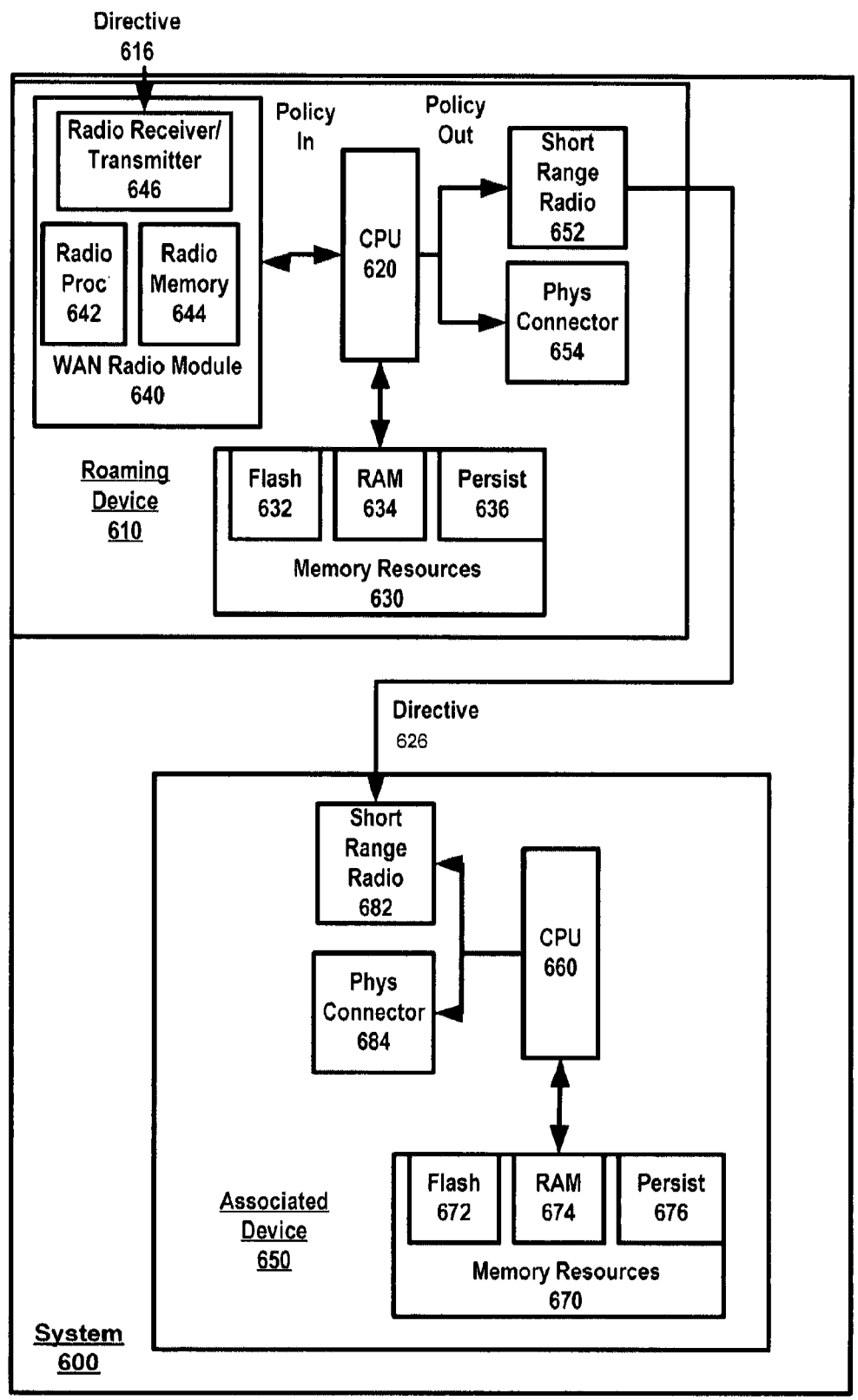
FIG. 6 is a hardware diagram for a system comprising paired computing devices, according to one or more embodiments of the invention.

FIG. 6 is a hardware diagram for a system comprising paired computing devices, according to any of the embodiments such as described with FIG. 1-5. In an embodiment, a system 600 includes a connected roaming device 610 and an associated computing device 650 paired with the roaming device. In an embodiment, the roaming device 610 is a cellular telephony device, such as a smart phone or mobile manager, capable of cellular telephony, messaging, and data exchange. The associated computing device 650 may be any kind of computing device, such as a laptop computer, light computing device, laptop, personal digital assistant or desktop computer.

Components of the roaming device 610 include a central processor 620, memory resources 630, a WAN radio module 640, and one or more local connection ports 652, 654. In an embodiment, the WAN radio module 640 includes a separate radio processor 642, memory 644 and radio transmitter/receiver 646. In one implementation, the WAN radio module 640 transmits and receives radio communications on a cellular data network. Other forms of wireless connectivity, such as WiMAX, may be provided in alternative implementations. The memory resources 630 on the roaming device may include Flash memory 632, Random Access Memory 634, and persistent memory 636 (i.e. ROM). The local connection ports 652 may include a wireless port, such as provided by Bluetooth or wireless USB. The local connection ports 654 may also include a wireline connection, such as provided by a physical USB port. According to an embodiment, the components of the associated device 650 may include a CPU 660, memory resources 670, and one or more local communication ports, including a local wireless port 682 (e.g. Bluetooth) and a physical data connector port 684. Memory resources 670 may include Flash memory 672, RAM 674 and persistent memory 676.

In embodiment, the memory resources 630 of the roaming device 610 include instructions and data for implementing security features and policy on the device. Some policy (e.g. device password that can be implemented on the device 610) may be incorporated into the operating system of the device, while others are stored as program files or data. A remote policy directive 616 may be received in the form of a cellular communication, from a policy node (not shown) on the WAN radio module 640. The CPU 620 may be triggered by the directive 616 to retrieve and execute policy instructions from the memory resources 630. Alternatively, the CPU may be configured to configure and/or maintain an existing policy that is established on the roaming device. The policy that is implemented, configured or maintained may govern safeguards and security features on the device 610, to protect, for example, access to some or all of the device's resources. For example, the implemented policy may protect records, files, and/or in the Flash memory 632. As another example, the implemented policy may enable or disable a security feature provided with the operating system of the device 610.

In response to receiving the remote policy directive 616, the CPU 620 of the roaming device 610 may also be configured to issue an associated policy directive 626 to the associated device 650. Depending on the implementation or conditions, the CPU 620 may issue the directive 626 immediately, or alternatively wait until the associated device 650 is known to be present and in communication with the roaming device. The policy directive 626 may be communicated over the local wireless port 652, or alternatively over the connector port 654.

On the associated device 650, the directive 626 from the roaming device 610 may be received on any of the local ports 682, 684. As a result of the instruction 626, a given policy may be selected or configured, then executed, in accordance with any of the embodiments described herein. In an embodiment, the policy may safeguard data stored with the memory resources 670. Additionally, the policy that is selected or configured on the associated device 650 correlates to the policy that is on the roaming device 610. Still further, the two devices may run different policies, but the policy on the associated device 650 is determined or configured by the directive 626 from the roaming device 610. Numerous other implementations and variations are also possible.

A system such as described with an embodiment of FIG. 6 may be applicable to any other embodiment described herein, including embodiments of FIG. 1A and FIG. 1B, in which no remote directive is necessary, or an embodiment of FIG. 5 in which a kill pill or other data destruction action is performed as a result of communications exchanged between devices.

Alternative Embodiments

While an embodiment such as described with FIG. 1A and FIG. 1B illustrate the case where a security code 129 is transferred to the associated computing device 130, one or more embodiments provide that a token may be transferred carrying multiple data items. The token may include, for example, password and login information for enabling the associated computing device 130 to access an account, or even an online account. Such an embodiment provides for the assumption that the mere presence of the roaming device 120 authenticates the user, and the token can either substitute for information that the user would otherwise have to enter through use of the associated computing device 130, or the token provides that information (e.g. the user creates a file with the password and login). In addition to basic security information such as login and password, alternative embodiments contemplate, for example, financial information, or personal identifiable information of the user as being carried with the token.

While embodiments such as described with FIG. 1A and FIG. 1B provide that the user can access a device with the presence of the roaming device, one or more embodiments enable multiple users carrying different roaming devices to access a shared and associated device. In one embodiment, a shared device may include a guest or shared account. The security code of each roaming device may identify the device or the user by class. Each time the shared device receives the security code from a particular roaming device, the shared device makes certain class resources (e.g. a guest account) available.

An exemplary embodiment relates to a method of providing access to information accessed by a mobile device. The method includes interrogating an authenticating device and communicating an authentication data from the authentication device to the mobile device. The method also includes verifying the authentication data at the mobile device and permitting access to the information accessible by the mobile device when the communicated authentication data is recognized by the mobile device.

Another exemplary embodiment relates to an apparatus for providing authorized access to data contained within a mobile device. The apparatus includes a transceiver. The apparatus also includes a processor in communication with the transceiver. Access to the data contained within the mobile device is permitted when the transceiver receives an authorization request from the mobile device, the processor provides an authorization data to the transceiver for transmission to the mobile device and the mobile device recognizes the transmitted authorization data.

Further, an exemplary embodiment relates to a system for providing selective access of data. The system includes a first device configured to include the data. The system also includes a second device proximate to the first device. The first device is configured to communicate a first signal and the second device is configured to communicate a second signal. The first signal is received and recognized by the second device and the second signal is received and recognized by the first device to permit a user to access the data included in the first device.

Yet still another exemplary embodiment relates to a process for preventing unauthorized access of a first device. The process includes detecting the presence of a second device and verifying a signal communicated from the second device. The process also includes permitting access of data included in the first device when the signal is acceptable at the first device.

Figure 7:
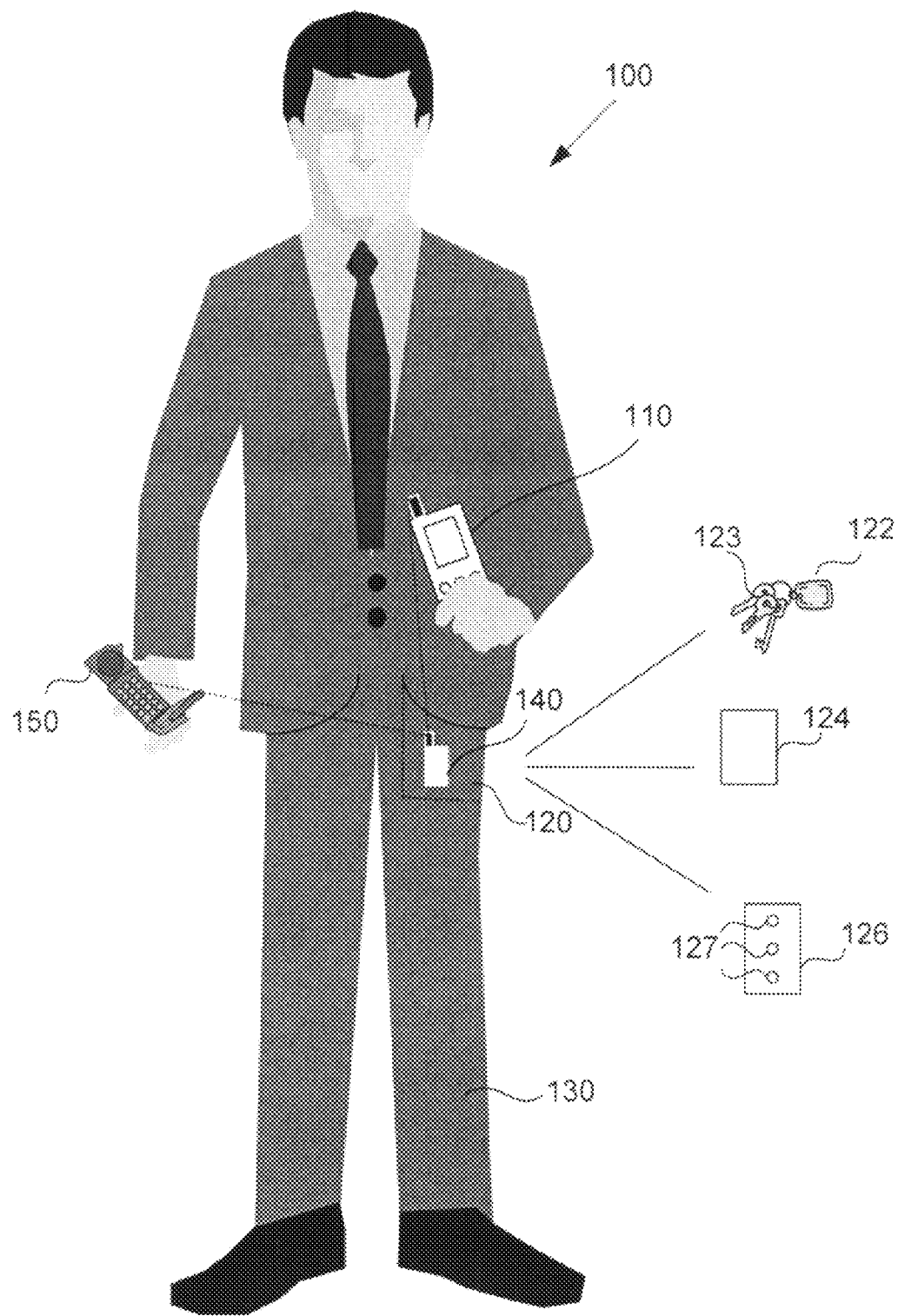
FIG. 7 is an illustration of an individual holding a mobile electronic device and carrying a wireless access device.

Referring to FIG. 7, an individual 100 is depicted. Individual 100 is shown carrying a portable or mobile electronic device 110. Mobile electronic device 110 may be any of a variety of portable electronic devices including, but not limited to a personal digital assistant (PDA), a handheld computer, a mobile or cellular telephone, a laptop computer, or any of a variety of other portable or mobile electronic devices. Shown disposed in pocket 120 of pants 130 being worn by individual 100 is a wireless access device 140. Wireless access device 140 may be a relatively small (although not limited in size) portable device which is separate from mobile electronic device 110. Mobile electronic device 110 may include or have access to sensitive information, such as personal information and/or financial information, and/or other sensitive information which is desired to be secured. Access device 140 is configured such that for individual 100 to gain access to the secured information which is accessed by device 110, access device 140 must be in the near vicinity or located proximal to the mobile device 110, that is it must be in wireless communication with the mobile device before any secured information may be accessed or utilized by individual 100.

In an exemplary embodiment, individual 100 may also carry a mobile telephone 150. Mobile telephone 150 may also contain personal, financial, and/or sensitive information which is desired to be secured. Further, it may be desirable that a person not authorized to utilize or make calls on cellular telephone 150 not have access to the use of mobile telephone 150 unless the person is the authorized user. Individual 100 may be identified as the authorized user by having or bringing access device 140 into wireless communication with mobile telephone 150.

When individual 100 wishes to access confidential data on mobile device 110, mobile device 110 may check for the presence of access device 140 and each of devices 140 and 110 may authenticate itself to the other. Once the authentication is achieved, the user may access information through mobile device 110.

If mobile device 110 becomes lost, stolen, misplaced, or is being used or tampered with by an unauthorized person, access device 140, being carried by individual 100 may be out of range of device 110 or and/or mobile telephone 150. When device 140 is out of range of mobile device 110, access to sensitive information or unauthorized use of the device 110, such as making phone calls on mobile telephone 150, may be disabled. In one embodiment, a user may not gain access to any information accessible by mobile device 110 when access device 140 is out of range. However, in another exemplary embodiment, access to specific selected data may be provided through mobile device 110 when access device 140 is out of range. In a further exemplary embodiment, mobile phone 150 may be completely disabled when out of range of access device 140. However, in yet another exemplary embodiment, a variety of selected services may be disabled when access device 140 is out of range, such as, but not limited to, the use of roaming and/or long distance, etc.

Access device 140 may be configured in any of a variety of convenient configurations, including, but not limited to, a key fob device depicted as key fob 122 which is designed to hang from a key ring 123, a card like device, configured to flip into or fit into a pocket or a wallet depicted as card 124, or any of a variety of other devices such as a device to be slipped into a pocket or purse 126 that includes a plurality of buttons 127 which may provide a variety of functions, such as, but not limited to selective access to various services and/or information accessible by mobile device 110 and/or any of a variety of other devices including mobile phone 150.

Figure 8:
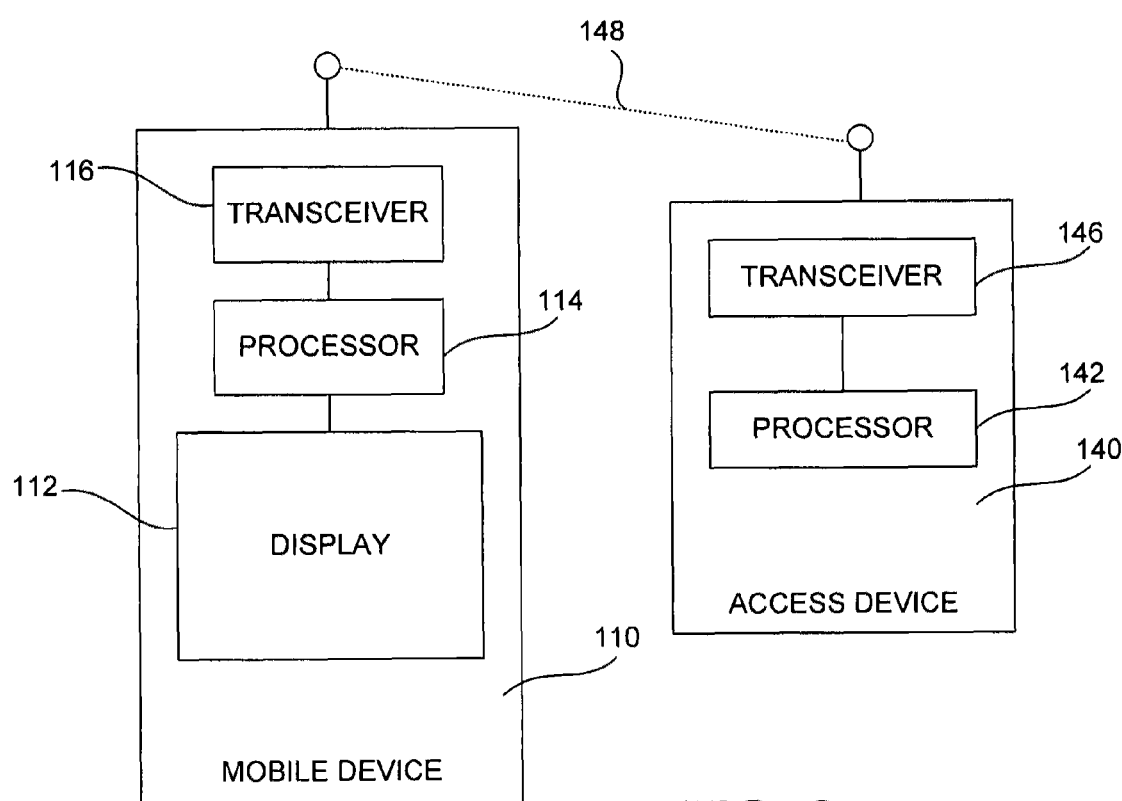
FIG. 8 is a block diagram of a mobile device in communication with an access device.

Referring now to FIG. 8, a block diagram representative of mobile device 110 is depicted. Mobile device 110 may include a display 112, a processor 114, and a transceiver 116. Display 112 may be any of a variety of displays, including, but not limited to, an LCD display. Processor 114 may be any of a variety of processors, including, but not limited to application specific integrated circuits (ASIC), a Dragonball processor, available from Motorola Inc. of Schaumburg, Ill., and/or any of a variety of other processors, including advanced RISC machine (ARM) based processors, and the like. Mobile device 110 thus may be any of a variety of mobile computing devices including handheld computers. Transceiver 116 may include but is not limited to any of a variety of transceiver devices, including radio frequency transceivers, infrared transceivers, ultrasonic transceivers and the like. Transceiver 116 may utilize any of a variety of electronic devices and protocols including Bluetooth, IEEE 802.11, time division multiple access (TDMA), code division multiple access (CDMA), global system for mobile communications (GSM), general packet radio system (GPRS), and the like.

Access device 140, which may be configured in any of a variety of configurations, as depicted in FIG. 7, may include a processor 142 and a transceiver 146. Processor 142 is utilized to interpret and authenticate signals received and transmitted between mobile device 110 and access device 140. Transceiver 146 is configured to communicate with transceiver 116 of mobile device 110. In an exemplary embodiment, transceiver 146 is configured with power which may transmit only short distances such as, but not limited to, ten feet, however, any of a variety of other distances and/or powers of transceiver 146 may be used depending on the application. In an exemplary embodiment, each of devices 110 and 140 include authentication certificates for each device. When mobile device 110 needs to access sensitive information, it connects to access device 140 over communications link 148. If the link is not established, or the device is not found, any protected services or access to any sensitive information is not allowed. If access device 140 is found, authentication certificates are exchanged between mobile device 110 and access device 140 over link 148 and both devices are authenticated. Upon authentication, protected services, or access to secured information is allowed on mobile device 110.

Figure 9:
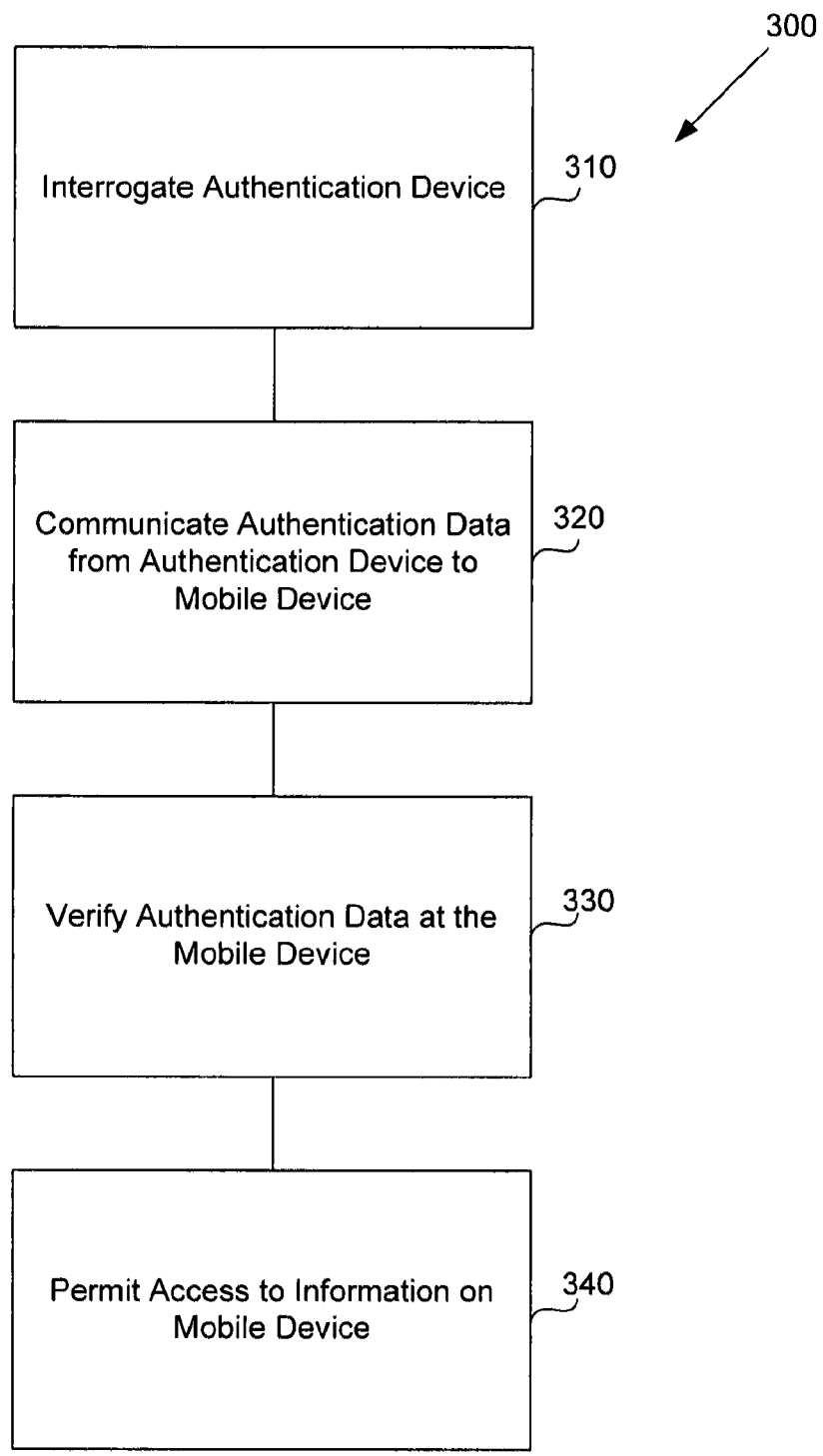
FIG. 9 is an exemplary process diagram depicting steps in the access of data on a mobile device.

Referring now to FIG. 9, a process 300 for accessing data on a mobile device is depicted. During use of a mobile device such as mobile device 110, an access device 140 is interrogated by mobile device 110 (step 310). Once a communications link is established between mobile device 110 and authentication or access device 140, authentication data is communicated from access device 140 to the mobile device (step 320). Authentication may include any of a variety of data, methods, etc., including such data and methods as digital signatures, encryption (private key and public key), digital certificates, passwords, etc. Authentication data is received by mobile device 110 and the authentication data is verified by the mobile device (step 330). Once verified, the mobile device then allows access by a user to information or services which were secured on the mobile device (step 340).

Figure 10:
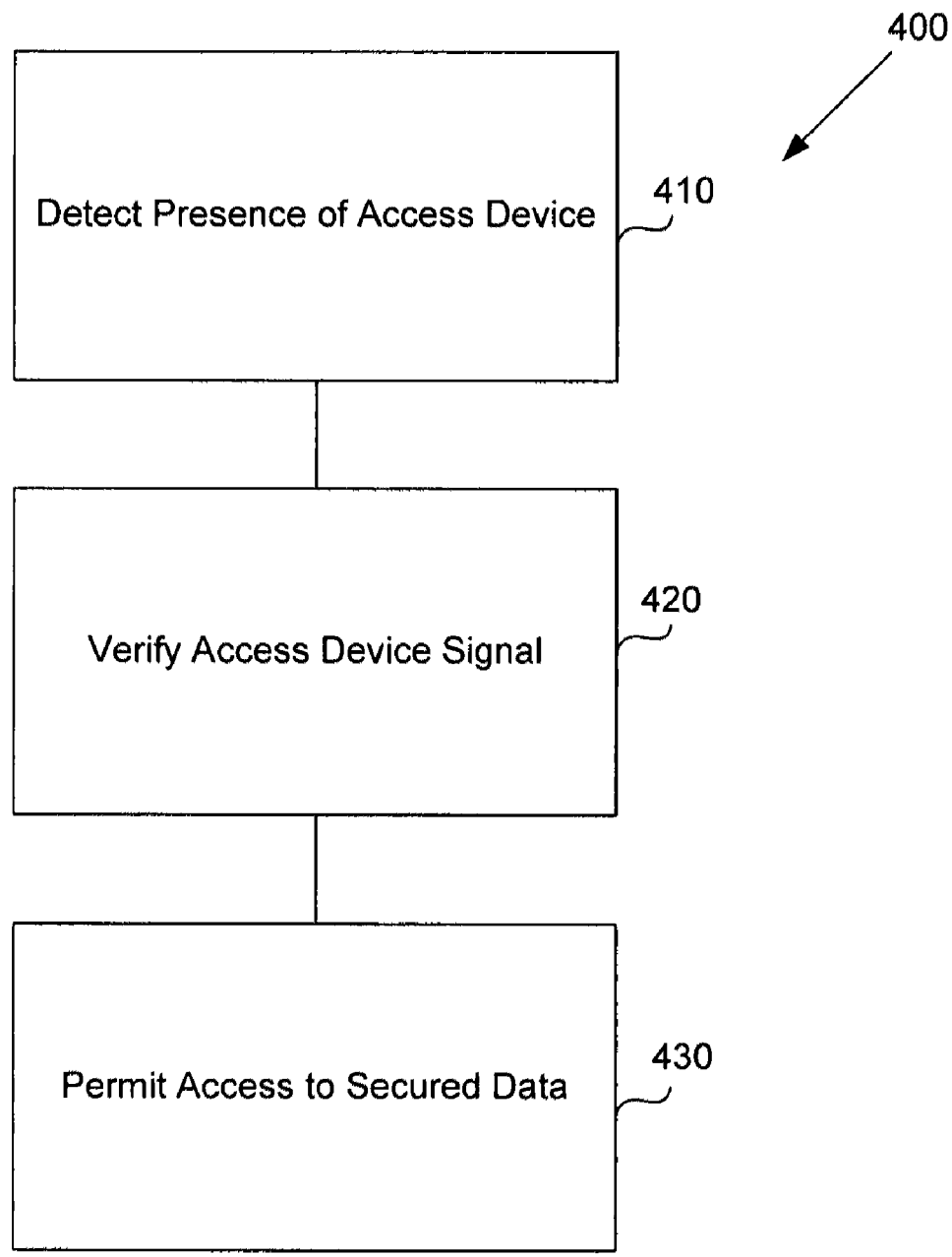
FIG. 10 is an exemplary process diagram depicting steps associated with access of secured data.

Referring now to FIG. 10, in an alternative embodiment an exemplary process for accessing secured data is depicted. When a user is utilizing a mobile device, the mobile device is enabled either manually or automatically to detect the presence of an access device (step 410). A signal is received from the access device including a password or other authentication data. The mobile device verifies the access device signal (step 420) and, if properly verified, the mobile device would then permit access to secured services or secured data on the mobile device (step 430).

In an exemplary embodiment, mobile device 110 transmits a proximity query by the mobile device to the authentication or access device 140 in order to determine whether authentication or access device 140 is within communications range of the mobile device. In particular exemplary embodiments, access device 140 must be within ten feet of mobile device 110. However, any of a variety of distances may be used without departing from the scope of the invention. Further, in an exemplary embodiment, access to data on the mobile device may be requested with access device 140 in a variety of manners including, but not limited to, when mobile device 110 is transferred into active mode, such as a specific application is started or the device is switched on. Further, access may be requested periodically at a plurality of preset or reoccurring time periods.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method for securing data on a computing device, the method comprising:
   implementing, based on a policy of the computing device, one or more security features on the computing device to prevent access to a first resource of the computing device and allow access to a second resource of the computing device;
   receiving a security code from a roaming device over a local, wireless communication port; and
   using the security code to alter implementation of at least one of the security features by suspending or reducing one or more user actions user actions that would otherwise be required by the at least one of the security features in order to access the first resource of the computing device.

2. The method of claim 1, wherein receiving a security code from a roaming device includes receiving, from the roaming device, at least one of (i) an identifier of the roaming device; (ii) data corresponding to a password that would otherwise be required to be entered by the user to access the first resource on the computing device; and (iii) an encryption key.

3. The method of claim 1, wherein receiving a security code from a roaming device includes receiving, from the roaming device, data corresponding to a password, and wherein using the security code includes programmatically entering the password for the at least one security feature.

4. The method of claim 1, wherein the local, wireless communication port is either a Bluetooth port or a wireless Universal Serial Bus port.

5. The method of claim 1, wherein receiving a security code from a roaming device includes receiving the security code in response to detecting the roaming device is in range for the local, wireless communication port.

6. The method of claim 5, wherein receiving a security code from a roaming device includes (i) activating the computing device from an inactive state, (ii) attempting to communicate with the roaming device using the local, wireless communication port, and (iii) receiving the security code after attempting to communicate with the roaming device.

7. The method of claim 6, wherein receiving the security code after attempting to communicate with the roaming device is performed only after determining the roaming device is in an active state of use.

8. The method of claim 1, wherein implementing one or more security features on the computing device includes enabling a user to select the one or more security features through interaction with a user-interface provided on the computing device.

9. The method of claim 1, wherein implementing one or more security features includes performing one or more of (i) denying access to data or an application on the computing device; (ii) encrypting at least some of the data on the computing device; and (iii) maintaining the computing device in a state that is not operable to a user.

10. The method of claim 9, wherein denying access to at least some data stored on the computing device includes implementing or maintaining in effect one or more security features on the computing device.

11. The method of claim 1, wherein receiving a security code from a roaming device includes receiving, from the roaming device, data corresponding to a password that would otherwise be required to be entered by the user to access the first resource on the computing device.

12. A method for securing data on a first computing device, the method comprising:
   on the first computing device, establishing a pairing with a designated roaming device;
   in response to a security event, making a determination as to whether the designated roaming device is present in an area of the first computing device;
   denying access to first data stored on the first computing device and allowing access to second data stored on the first computing device, based on a policy of the computing device, if the determination is that the designated roaming device is not present in the area of the first computing device; else
   providing access to the first data stored on the first computing device, based on the policy of the computing device, if the determination is that the designated roaming device is present in the area of the first computing device.

13. The method of claim 12, wherein making a determination as to whether the designated roaming device is present in an area of the first computing device includes determining whether the designated roaming device is detectable using a local wireless communication port.

14. The method of claim 13, determining whether the designated roaming device is detectable includes identifying a device name or identifier of the designated roaming device using the local wireless communication port.

15. The method of claim 13, wherein making a determination as to whether the designated roaming device is present in an area of the first computing device is performed in response to a user powering on the first computing device for use.

16. The method of claim 13, wherein making a determination as to whether the designated roaming device is present in an area of the first computing device is performed in response to a user physically interacting with the designated roaming device.

17. The method of claim 13, wherein making a determination as to whether the designated roaming device is present in an area of the first computing device is performed in response to one or more conditions that include a passage of time.

18. The method of claim 12, wherein the first computing device is not equipped for cellular communications, and wherein the designated roaming device is equipped for cellular communications.

19. The method of claim 12, further comprising:
   designating the roaming device for the first computing device based on an identifier communicated by the roaming device; and
   making a determination as to whether a designated roaming device is present includes detecting the identifier.

20. The method of claim 19, wherein designating the roaming device for the first computing device based on an identifier includes designating the roaming device based on a wireless transmission from the roaming device, and wherein detecting the identifier includes detecting the identifier by receiving the wireless transmission.

21. The method of claim 20, wherein the wireless transmission is a short-range radio frequency transmission that is detectable over the area.

22. The method of claim 12, wherein implementing a security feature includes performing any one or more of (i) denying a user access to a user account provided on the first computing device, (ii) requiring the user to enter a password to access the first data on the first computing device, (iii) maintaining an encrypted state of the first data on the first computing device, (iv) switching the first computing device to a non-operational state, (v) generating an audible indication, (vi) displaying a message on a screen of the first computing device, and (vii) destroying the first data on the first computing device.

23. A computing system for communicating between a laptop computer and a nearby mobile computing device, comprising:
- a laptop computer housing;
- a display coupled to the housing;
- a plurality of buttons coupled to the housing;
- a transceiver configured for wireless communication with the mobile computing device;
- a memory configured to store first data and second data; and
- a processor configured to detect the presence of the mobile computing device, wherein the processor is configured to restrict access by a user to the first data via the display and allow the user access to the second data via the display, based on a policy of the processor, when the mobile computing device is absent, and wherein the processor is configured, based on the policy of the processor, to allow the user to access the first data and the second data via the display when the mobile computing device is present.

24. The computing system of claim 23, wherein the processor is configured to require the user to enter a password to protect the first data.

25. The computing system of claim 24, wherein the processor is configured to allow access to the first data without a password when the mobile computing device is present.

26. The computing system of claim 23, wherein the processor is configured to allow access to protected services when the mobile computing device is present.

27. The computing system of claim 23, wherein the processor is configured to automatically detect the presence of the mobile computing device.

28. The computing system of claim 23, wherein the transceiver is configured to communicate with the mobile computing device using a Bluetooth or IEEE 802.11 protocol.

29. The computing system of claim 23, wherein the processor is configured to authenticate a communication from the mobile computing device and to allow access to the first data when the mobile computing device is present and the communication is authenticated.

30. The computing system of claim 29, wherein the processor is configured to authenticate the communication using at least one digital certificate.

31. The computing system of claim 23, further comprising the mobile computing device.

32. The computing system of claim 21, wherein the mobile computing device is a handheld device configured to fit into a person's pocket.

33. The computing system of claim 32, wherein the mobile computing device comprises a plurality of buttons.

34. The computing system of claim 33, wherein the mobile computing device is configured to access the data stored in the memory.

35. The computing system of claim 33, wherein the mobile computing device is configured for telephony communications and data communications.

36. The computing system of claim 23, wherein the processor is configured to detect the presence of the mobile computing device by transmitting a message to the mobile computing device to determine whether the mobile computing device is within communication range of the mobile device.

37. The computing system of claim 23, wherein the processor is configured to periodically transmit data to the mobile computing device at a preset time period.

38. A computing system for communicating between a handheld computing device and a nearby laptop computer having memory and a display, comprising:
- a handheld computer having a housing configured to fit in a person's pocket;
- a plurality of buttons coupled to the housing;
- a portable power source;
- a transceiver configured for wireless communication with the laptop computer; and
- a processor configured to send a message to the laptop computer to indicate the handheld computing device is present, the laptop computer being configured, based on a policy of the processor, to restrict access by a user to first data stored in the memory via the display and allow the user access to second data stored in the memory via the display until the message is received, the laptop computer being configured to allow the user access to the first data stored in the memory in response to receiving the message.

39. The computing system of claim 38, the laptop computer being configured to require a user to enter a password to protect the first data.

40. The computing system of claim 39, the laptop computer being configured to allow access to the first data without a password when the handheld computing device is present.

41. A method for securing data on a computing device with a roaming device, the method comprising:
- implementing, based on a policy of the roaming device, one or more security features on the computing device to prevent access to a first resource of the computing device and allow access to a second resource of the computing device;
- receiving a security code from the roaming device over a local, wireless communication port; and
- using the security code to alter implementation of at least one of the security features by suspending or reducing one or more user actions that would otherwise be required by the at least one of the security features in order to access the first resource of the computing device.

* * * * *